(12) United States Patent
Rhee

(10) Patent No.: US 7,304,951 B2
(45) Date of Patent: Dec. 4, 2007

(54) METHODS AND SYSTEMS FOR RATE-BASED FLOW CONTROL BETWEEN A SENDER AND A RECEIVER

(75) Inventor: Injong Rhee, Raleigh, NC (US)

(73) Assignee: North Carolina State University, Raleigh, NC (US)

(*) Notice: Subject to any disclaimer, the term of this patent is extended or adjusted under 35 U.S.C. 154(b) by 921 days.

(21) Appl. No.: 09/989,957

(22) Filed: Nov. 21, 2001

(65) Prior Publication Data

US 2002/0181494 A1 Dec. 5, 2002

Related U.S. Application Data

(60) Provisional application No. 60/252,153, filed on Nov. 21, 2000.

(51) Int. Cl.
*H04J 1/16* (2006.01)
(52) U.S. Cl. ............................ 370/235; 370/253
(58) Field of Classification Search ................ 370/229, 370/230, 230.1
See application file for complete search history.

(56) References Cited

U.S. PATENT DOCUMENTS

| | | | |
|---|---|---|---|
| 6,560,243 B1 * | 5/2003 | Mogul | 370/468 |
| 6,646,987 B1 * | 11/2003 | Qaddoura | 370/231 |
| 6,757,255 B1 * | 6/2004 | Aoki et al. | 370/252 |
| 2002/0071388 A1 * | 6/2002 | Bergsson et al. | 370/230 |

OTHER PUBLICATIONS

File History for U.S. Appl. No. 09/714,348, filed Nov. 16, 2000.
Martin et al., "The Incremental Deployability of RTT-Based Congestion Avoidance Over High-Speed TCP Internet Connections," Proceedings of ACM SIGMETRICS, pp. 1-23 (Jun. 2000).
Floyd et al., "Equation-Based Congestion Control for Unicast Applications," Technical Report, ACIRI, pp. 1-14 (Feb. 2000).
Ramesh et al., "Issues in Model Based Flow Control," Technical Report TR-99-15, Department of Computer Science, North Carolina State University, pp. 1-16 (Nov. 1999).
Yano et al., "The Breadcrumb Forwarding Service and the Digital Fountain Rainbow: Toward a TCP-Friendly Reliable Multicast," Technical Report UCB/CSD-99-1068, Computer Science Division, University of California, Berkeley, pp. 1-15 (Oct. 1999).
Floyd et al., "Promoting the Use of End-to-End Congestion Control in the Internet," IEEE/ACM Transactions on Networking, vol. 7, No. 4, pp. 458-472 (Aug. 1999).

(Continued)

*Primary Examiner*—Doris H. To
*Assistant Examiner*—Christopher Grey
(74) *Attorney, Agent, or Firm*—Jenkins, Wilson, Taylor & Hunt, P.A.

(57) ABSTRACT

Methods and systems for rate-based flow control between a sender and a receiver are disclosed. A receiver performs TCP-like flow control calculations based on packets received from a sender. The receiver calculates a transmission rate and forwards the transmission rate to the sender. The sender sends packets to the receiver at the rate calculated by the receiver. Thus, rather than having sender-based flow control as in TCP, the receiver controls the rate at which packets are delivered.

33 Claims, 37 Drawing Sheets

OTHER PUBLICATIONS

Rubenstein et al., "The Impact of Multicast Layering on Network Fairness," Proceedings of SIGCOMM, pp. 27-38 (Aug. 1999).

Speakman et al., "PGM Reliable Transport Protocol Specification," Internet Draft, pp. 1-104 (Jun. 1999).

Tan et al., "Real-Time Internet Video Using Error Resilient Scalable Compression and TCP-Friendly Transport Protocol," IEEE Transactions on Multimedia, vol. 1, No. 2, pp. 172-186 (Jun. 1999).

Golestani et al., "Fundamental Observations on Multicast Congestion Control in the Internet," Proceedings of IEEE INFOCOM, pp. 990-1000 (Mar. 1999).

Rhee et al., "MTCP: Scalable TCP-Like Congestion Control for Reliable Multicast," Proceedings of IEEE INFOCOM, Abstract and pp. 1-34 (Mar. 1999).

Li et al., "Multi-Session Rate Control for Layered Video Multicast," Proceedings of Symposium on Multimedia Computing and Networking, pp. 175-189 (Jan. 1999).

Balakrishnan et al., "The Effects of Asymmetry on TCP Performance," ACM Mobile Networks and Applications (MONET), pp. 219-241 (1999).

Rejaie et al., "RAP: An End-To-End Rate-Based Congestion Control Mechanism for Realtime Streams in the Internet," Proceedings of IEEE INFOCOM, pp. 1-27 (1999).

Tuan et al., "Multiple Time Scale Congestion Control For Self-Similar Network Traffic," Performance Evaluation, pp. 359-386 (1999).

Whetten, "Target Goals for RM Congestion Control Algorithms," IRTF Reliable Multicast Research Group Meeting in George Mason, Virgina, pp. 1-28 (Dec. 1998).

Sisalem et al., The Loss-Delay Adjustment Algorithm: A TCP-Friendly Adaptation Scheme, Workshop on Network and Operating System Support for Digital Audio and Video, pp. 1-15 (Jul. 1998).

Cen et al., "Flow and Congestion Control for Internet Streaming Applications," Proceedings of Multimedia Computing and Networking, pp. 1-14 (Jan. 1998).

Padhye et al., "Modeling TCP Throughput: a Simple Model and Its Empirical Validation," Proceedings of SIGCOMM, pp. 1-23 (1998).

Handley et al., "Strawman Specification for TCP Friendly (Reliable) Multicast Congestion Control (TFMCC)," IRTF Reliable Multicast Research Group Meeting in Pisa, Italy, pp. 1-17 (Jun. 1999).

Lakshman et al., "Window-Based Error Recovery and Flow control With a Slow Acknowledgement Channel: A Study of TCP/IP Performance," Proceedings of IEEE INFOCOM, pp. 1199-1209 (Aug. 1997).

Vicisano et al., "TCP-Like Congestion Control for Layered Multicast Data Transfer," Proceedings of IEEE INFOCOM, pp. 1-8 (Aug. 1997).

Jacobs et al., "Real-Time Dynamic Rate Shaping and Control for Internet Video Applications," *Proceedings of the Workshop on Multimedia Signal Processing*, pp. 23-25 (Jun. 1997).

Balakrishnan et al., "A Comparison of Mechanisms for Improving TCP Performance Over Wireless Links," *IEEE/ACM Transactions on Networking*, pp. 756-769 (Dec. 1997).

Wu et al., "Thin Streams: An Architecture for Multicasting Layered Video," Proceedings of The Seventh International Workshop on Network and Operating Systems Support for Digital Audio and Video (NOSSDAV 97), pp. 1-10 (May 1997).

Mahdavi et al., "TCP-Friendly Unicast Rate-Based Flow Control," pp. 1-4 (Jan. 1997).

Crovella et al., "Self-Similarity in World Wide Web Traffic: Evidence and Possible Causes," Proceedings of 1996 ACM SIGMETRICS International Conference on Measurement and Modeling of Computer Systems, pp. 1-25 (May 1996).

Bhattacharjee et al., "On Active Networking and Congestion," Technical Report GIT-CC-96-02, College of Computing, Georgia Tech, pp. 1-23 (1996).

McCanne et al., "Receiver-Driven Layered Multicast," Proceedings of SIGCOMM, pp. 1-32 (1996).

Talpade et al., "Single Connection Emulation (SCE): An Architecture for Providing a Reliable Multicast Transport Service," Proceedings of the IEEE International Conference on Distributed Computing Systems, pp. 144-151 (Jun. 1995).

Willinger et al., "Self-Similarity Through High-Variability: Statistical Analysis of Ethernet LAN Traffic at the Source Level," Proceedings of the ACM SIGCOMM, pp. 100-113 (1995).

Leland et al., "On the Self-Similar Nature of Ethernet Traffic," IEEE/ACM Transactions on Networking, vol. 2, No. 1, pp. 1-15 (Feb. 1994).

Paxson et al., "Wide-Area Traffic: Failure of Poisson Modeling," Proceedings of the ACM SIGCOMM, pp. 257-268 (1994).

Whetten et al., "Reliable Multicast Transport Building Blocks for One-to-Many Bulk-Data Transfer, " IETF Internet-Draft, http://www.ietf.org/rfc/rfc3048.txt, pp. 1-19 (Jan. 2001).

Lee et al., "An Application Level Multicast Architecture for Multimedia Communications in the Internet, " IRTF Reliable Multicast Research Group (Nov. 1999).

Ramesh et al., "Issues in Model-Based Flow Control, " IRTF Reliable Multicast Research Group, pp. 1-14 (Nov. 1999).

Luby et al., "Heterogeneous Multicast Congestion Control Based on Router Packet Filtering, " IRTF Reliable Multicast Research Group, pp. 1-13 (May 31, 1999).

Bhattacharyya et al., "The Loss Path Multiplicity Problem for Multicast Congestion Control, " In Proceedings of IEEE INFOCOM, pp. 856-863 (1999).

Padhye et al., "A Model Based TCP-Friendly Rate Control Protocol, " In Proceedings of the Ninth International Workshop on Network and Operating Systems Support for Digital Audio and Video (1999).

Tuan et al., "Multiple Time Scale Redundancy Control for QoS-Sensitive Transport of Real-Time Traffic, " In Proceedings of INFOCOM, pp. 1683-1692 (2000).

Li et al., "HPF: A Transport Protocol for Supporting Heterogeneous Packet Flows in the Internet, " Research Paper, Coordinated Sciences Laboratory, University of Illinois at Urbana-Champaign, pp. 543-550 (1998).

Turletti et al., "Experiments with a Layered Transmission Scheme Over the Internet, " Technical Report RR-3296, pp. 1-26 (Nov. 1997).

Mathis et al., "The Macroscopic Behavior of the TCP Congestion Avoidance Algoithm, " ACM Computer Communication Review, 27 (3), pp. 67-82 (Jul. 1997).

Floyd, "Connections with Muliple Congested Gateways in Packet-Switched Networks Part 2: Two-Way Traffic, " Unpublished draft, pp. 1-8 (Dec. 1991).

* cited by examiner

METHODS AND SYSTEMS FOR RATE-BASED FLOW CONTROL BETWEEN A SENDER AND A RECEIVER

PRIORITY CLAIM

This application claims the benefit of U.S. provisional patent application No. 60/252,153 filed Nov. 21, 2000, the disclosure of which is incorporated herein by reference in its entirety.

TECHNICAL FIELD

The present invention relates to methods and systems for flow control between a sender and a receiver in a computer network. More particularly, the present invention relates to methods and systems for rate-based flow control between a sender and a receiver.

BACKGROUND ART

As the Internet becomes diversified in its capabilities, it becomes feasible to offer services that were not possible under earlier generations of Internet technologies. Real-time multimedia streaming and IP multicast are two such emerging technologies. The development and use of commercial applications based on these technologies, such as Internet telephony, will become increasingly prevalent, and their traffic will constitute a large portion of the Internet traffic in the future.

Congestion and flow control are integral parts of any Internet data transport protocol whose traffic travels a shared network path. It is widely accepted that the congestion avoidance mechanisms employed in TCP have been one of the key contributors to the success of the Internet. However, few commercial streaming applications today are equipped with end-to-end flow control. The traffic generated by these applications is unresponsive to congestion and can completely lock out other competing flows, monopolizing the available bandwidth. The destructive effect of such traffic on the Internet commonwealth is commonly referred to as congestion collapse.

TCP is ill-suited for real-time multimedia streaming applications because of their real-time and loss-tolerant natures. The bursty transmission, and abrupt and frequent deep fluctuations in the transmission rate of TCP cause delay jitters and sudden quality degradation of multimedia applications. For asymmetric networks, such as wireless networks, cable modems, ADSL, and satellite networks, transmitting feedback for (almost) every packet received as it is done in TCP is not advantageous because of lack of bandwidth on the reverse links. In asymmetric networks, packet losses and delays occurring in reverse paths severely degrade the performance of existing round trip based protocols, such as TCP, resulting in reduced bandwidth utilization, fairness, and scalability. The use of multicast further complicates the problem: in large-scale multicast involving many receivers (10,000 to 1M receivers), frequent feedback sent directly to the sender causes the sender to be overwhelmed acknowledgment messages. Accordingly, there exists a long-felt need for methods and systems for end-to-end flow control that avoid the difficulties associated with conventional flow control protocols.

DISCLOSURE OF THE INVENTION

The present invention includes methods and systems for rate-based flow control between a sender and a receiver. In conventional TCP, flow control is implemented using a congestion window maintained by the sender based on acknowledgements received from the receiver. As discussed above, sending per packet acknowledgements consumes bandwidth on the path between the receiver and the sender. According to the present invention, the receiver calculates its own congestion window size, calculates a transmission rate, and periodically forwards the calculated rate information to the sender. The sender uses the rate information to the control the flow of data to the receiver. Because the receiver calculates the congestion window size, per packet acknowledgements to the sender are not required. Consequently, bandwidth utilization of the network is improved.

The rate computed by the receiver may be an average rate. For example, the receiver may compute congestion window sizes for a plurality of time intervals. The receiver divides each congestion window size by its associated time interval to obtain a transmission rate. The receiver calculates a final transmission rate by computing a weighted average of the transmission rates for each epoc, with the transmission rates for the most recent epochs being weighted most heavily. By computing an average transmission rate, the flow control protocol according to the present invention reduces sudden changes in flow rate associated with conventional flow control protocols and is more suitable for streaming applications.

Accordingly, it is an object of the invention to provide a suite of end-to-end flow control protocols for unicast and multicast real-time streaming applications. The developed protocols are evaluated based on TCP-friendliness, stability, and scalability. These properties hold regardless of the types of networks, or, more specifically, whether networks are symmetric or asymmetric in bandwidth and delays.

The properties are defined as follows:

Fairness and TCP-friendliness: let B be the total bandwidth used by n TCP flows when they are only flows running on an end-to-end path. Suppose that there are m flows (of any protocol) running on that same path, then each flow must use a B/m bandwidth share.

Stability: after a network undergoes some peturbation because of flows joining and leaving, if the network reaches steady state, regardless of the state of the protocol at the end of the perturbation, the protocol eventually reaches the fair and TCP-friendly rate.

Scalability: the performance of a protocol instance does not depend on the number of receivers.

The present invention achieves these goals by implementing a technique, referred to herein as TCP emulation at receiver (TEAR), that shifts most of flow control mechanisms to receivers. In TEAR, a receiver does not send to the sender the congestion signals detected in its forward path but rather processes the congestion signals immediately to determine its own appropriate receiving rate. In receiver-driven flow control methods such as those described in "Receiver-Driven Layered Multicast," by S. McCanne, V. Jacobson, and M. Vetterli, in *Proceedings of SIGCOMM*, Stanford, Calif., 1996, and "Multi-Session Rate Control for Layered Video Multicast," by X. Li, S. Paul, and M. Ammar, in *Proceedings of Symposium on Multimedia Computing and Networking*, San Jose, Calif., January 1999, the disclosures of both of which are incorporated herein by reference in their entirety, this rate can be used by that receiver to control its receiving rate independently without any feedback. In sender-driven flow control methods, such as the method described in "Strawman Specification for TCP Friendly (Reliable) Multicast Congestion Control (TFMCC)," by M. Handley, S. Floyd, and B. Whetten, *IRTF Reliable Multicast Research Group Meeting*, Pisa, Italy, June 1999, the disclosure of which is incorporated herein by reference in its entirety, the rate can be sent to the sender for controlling the transmission rate. This feedback occurs much less frequently than that used for acknowledgment in TCP. Thus, TEAR is more scalable and suitable for multicast and asymmetric networks.

TEAR can determine the "appropriate" receiving rates of receivers based on congestion signals observed at the receiver, such as packet arrivals, packet losses, and timeouts. Using these signals, TEAR emulates the TCP sender's flow control functions at receivers, including slow start, fast recovery, and congestion avoidance. This emulation allows receivers to estimate a TCP-friendly rate for the congestion conditions observed in their forward paths. Further, TEAR smoothes estimated values of steady-state TCP throughput by filtering noise. This smoothed rate estimate will be reflected in the rate adjustment of receiving rates (e.g., by asking the sender to set the transmission rate to the smoothed rate estimate). Therefore, TEAR-based flow control can adjust receiving rates to a TCP-friendly rate without actually modulating the rates to probe for spare bandwidth or to react to packet losses directly. Thus, the perceived rate fluctuations at the application are much smoother than in TCP and more suitable for streaming media applications.

Accordingly, it is another object of the invention to provide smooth flow control traffic rate adjustments.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
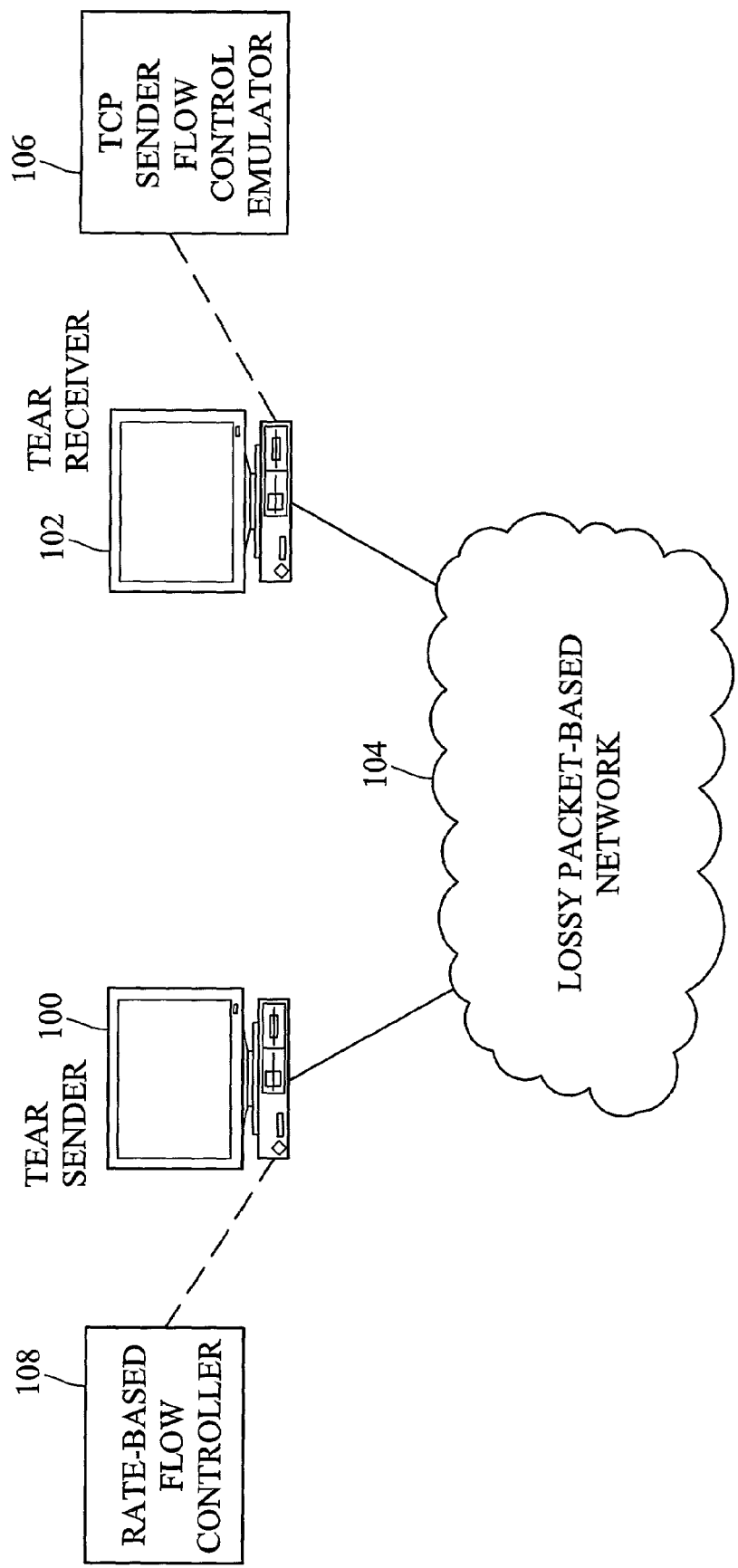
FIG. 1 is a block diagram of a lossy packet based network including a TEAR sender and a TEAR receiver according to an embodiment of the present invention.

FIG. 1 illustrates a TEAR sender and a TEAR receiver including a rate-based flow control system according to an embodiment of the present invention. In FIG. 1, TEAR sender 100 and TEAR receiver 102 communicate over a lossy packet-based network 104, such as the Internet. TEAR sender 100 and tear receiver 102 may include general-purpose computing platforms, such as personal computers or workstations. According to an important aspect of the invention, TEAR receiver 102 includes a TCP sender flow control emulator 106 for emulating the flow control functions normally performed by a TCP sender and forwarding rate information to TEAR sender 100. TEAR sender 100 includes a rate-based flow controller 108 for controlling the flow of packets to TEAR receiver 102 based on rate information received from TEAR receiver 102.

Figure 2:
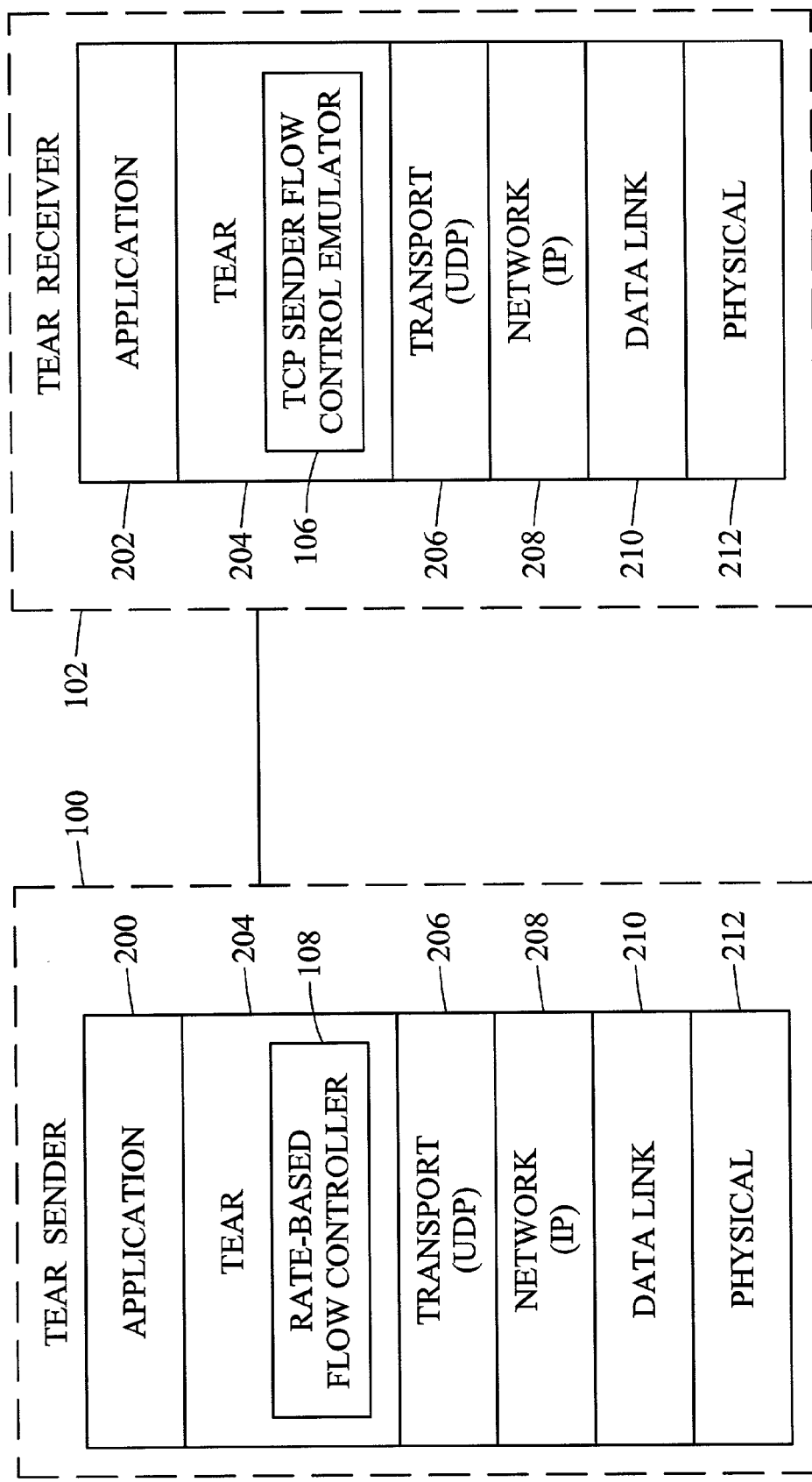
FIG. 2 is a protocol layer diagram illustrating the TEAR sender and a TEAR receiver according to an embodiment of the present invention.

FIG. 2 is a protocol layer diagram illustrating TEAR sender 100 and TEAR receiver 102 in more detail. In FIG. 2, TEAR sender 100 and TEAR receiver 102 each include communication protocol stacks. The communication protocol stacks each include an application layer. Application layer 202 of TEAR sender 100 may include a sending application, such as a multimedia application for sending streaming data to TEAR receiver 102. Application layer 202 of TEAR receiver 102 may include a receiving application, such as a multimedia player, for receiving streaming data from TEAR sender 200 and playing the streaming data to an end user. TEAR layers 204 of sender 100 and receiver 202 may reside between the application and transport layers for controlling the flow between the sending and receiving application. Transport layers 206 of sender 100 and receiver 102 may implement a connectionless flow control protocol, such as the user datagram protocol (UDP).

TEAR sender 100 and TEAR receiver 102 may also include network layers 208, data link layers 210, and physical layer 212. Network layers 208 may include Internet protocol software. Data link layers 210 and physical layers 212 may include hardware and software for sending and receiving data over a physical link, such as an Ethernet link.

In the examples described herein, it is assumed that the probability of having a packet loss within a window of x consecutively transmitted packets does not depend on the transmission rate. That is, no matter how large or small the intervals in which packets are transmitted, the probability that at least one packet in that window is lost is the same given the network conditions do not change during the transmission period. This assumption is referred to herein as rate independence.

In today's Internet, packets are dropped from routers indiscriminately of the transmission rates of flows when routers lack buffer space. Even in future Internet where more fair queuing and QoS mechanisms are provided, indiscriminate dropping of packets will still the case at least for the flows within the same class (because QoS provisioning is likely applied to aggregated flows). Rate independence holds if packet losses occur independently because packets are dropped indiscriminately at routers. Unfortunately, in today's Internet where droptail routers prevail, packet losses are highly correlated.

However, there have a number of studies that loss bursts in the Internet are short and the loss correlation does not span long intervals, typically less than one roundtrip time (RTT). Further, TCP can be typically modeled using a "loss event" which is informally defined to be a single loss burst (or the losses within the same TCP congestion window). This is because TCP reacts only once per loss event. In fact, some TCP literature assumes that loss events are not correlated and occur independently. Therefore, if losses within the same loss burst are treated as a single loss event, the behavior of loss events can be modeled using a Bernoulli model. When emulating TCP, TEAR ignores losses that are likely correlated and treats them as a single loss event. Under such operating conditions, rate independence can be generally assumed.

Rate independence plays an essential role in establishing the theoretical foundation of the present invention. One problem addressed by TEAR is to estimate the throughout of a TCP connection over the same end-to-end path only by observing packet arrival process of a TEAR connection at the receiver. Packets in TEAR may be transmitted at a different rate than those in the TCP connection. This assumption implies that a window of x packets in the TCP connection has the same loss probability as that in the TEAR connection regardless of their transmission rates. Thus, TEAR can ignore real time over which a window of packets is transmitted or the transmission rate of the connection where the estimation takes place.

Rounds

TCP maintains a variable called cwnd that indicates the number of packets in transit from the sender to the receiver. In TCP, cwnd is updated when the sender learns via an acknowledgment that a packet is received or not received by the receiver. For example, in TCP, a sender increases cwnd up to the maximum window size advertised by the receiver when acknowledgements are received in sequence. However, when one or more packets are lost, a TCP receiver sends a duplicate acknowledgement to the sender, and the sender reduces the congestion window size to a minimum value. The TCP sender then exponentially increases the congestion window size in response to acknowledgements received from the receiver during the slow start phase. Once the congestion window size reaches a predetermined value, referred to as ssthresh, the sender enters a congestion avoidance phase where the sender increases the congestion window size linearly in response to received acknowledgements until the advertised window size of the receiver is reached. Each time a packet is lost, the sender reduces the congestion window size to the minimum value, and increases the congestion window size in the slow start and congestion avoidance phases. This fluctuation in congestion window size is undesirable for streaming media applications in which a constant data rate is desirable. In addition, the reliance per-packet acknowledgements to adjust the congestion window size unnecessarily consumes network bandwidth.

TEAR maintains the cwnd variable at the receiver (instead of at the sender) and updates the cwnd variable according to the same algorithm as TCP based on the arrival of packets. However, since TEAR and TCP might be sending at different rates, the window update function cannot be described in terms of real-time (e.g., roundtrip time). Hence, TEAR software according to the present invention models the TCP window adjustment protocol in terms of rounds instead of round-trip times (RTT).

TEAR software according to the present invention partitions a transmission session into non-overlapping time periods, referred to as rounds. A new round begins when the current round ends. A round contains roughly an arrival of the cwnd number of packets. In TCP, a round is recognized at the sender when an acknowledgment packet is received for the reception of packets in the current congestion window (cwnd); whereas, in TEAR, the receiver can recognize a round when receiving packets.

Figure 3B:
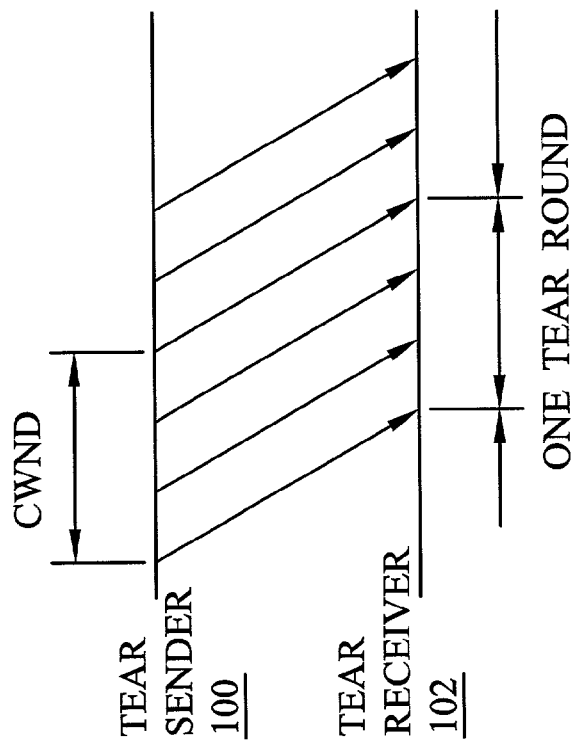
FIGS. 3A and 3B are packet flow diagrams illustrating conventional TCP rounds and TEAR rounds according to an embodiment of the present invention.
Figure 3A:
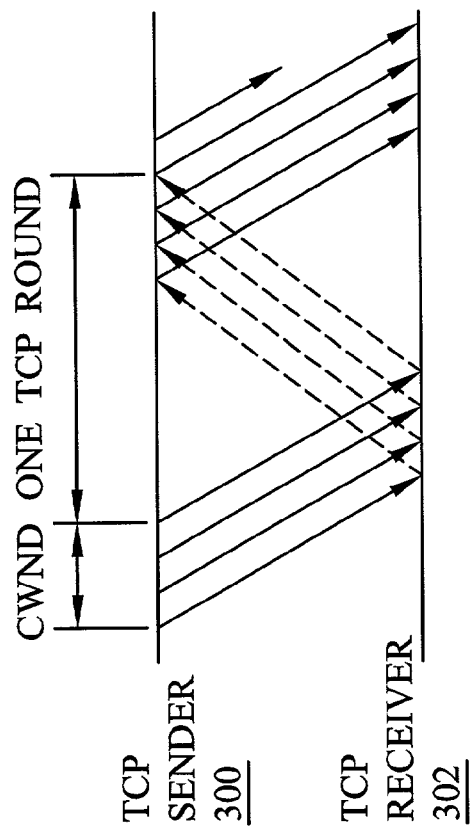

FIGS. 3A and 3B illustrate conventional TCP rounds and TEAR rounds according to an embodiment of the present invention. Referring to FIG. 3A, the uppermost horizontal line represents a TCP sender 300 and the lowermost horizontal line represents a TCP receiver 302. TCP sender 300 maintains a congestion window variable, cwnd, in order to determine how many packets can be consecutively sent to receiver 302 without receiving an acknowledgement. In the illustrated example, sender 300 sends cwnd packets to receiver 302. Receiver 302 acknowledges the cwnd packets. The acknowledgements are represented by the dashed arrows. A round in TCP consists of the time from sending the cwnd packets to receiving acknowledgements to the cwnd packets. In FIG. 3B, TEAR sender 100 sends cwnd packets to TEAR receiver 102. TEAR receiver 102 determines a round to be the time for receiving cwnd packets. This difference in calculating a round may cause cwnd to be updated at a different rate in TEAR than in TCP, since the TEAR receiver updates based on the time to receive cwnd packets instead of each RTT. In TEAR, the duration of a round depends on the inter-arrival times of cwnd packets, which depend on the transmission rate of TEAR. However, in TCP, a round implies one RTT since TCP updates its window at the sender at the reception of acknowledgment. To account for this discrepancy, TEAR estimates TCP throughput by assigning a fictitious RTT time to each round. When estimating the transmission rate during one round, TEAR divides the current value of cwnd by the current estimate of RTT instead of the real-time duration of the round. The TEAR receiver estimates the TCP throughput by taking a long-term weighted average of these per-round rates, and reports it to the sender. The sender sets its rate to that reported rate. The TEAR protocol will be explained in more detail below.

TEAR State Machine

Figure 4:
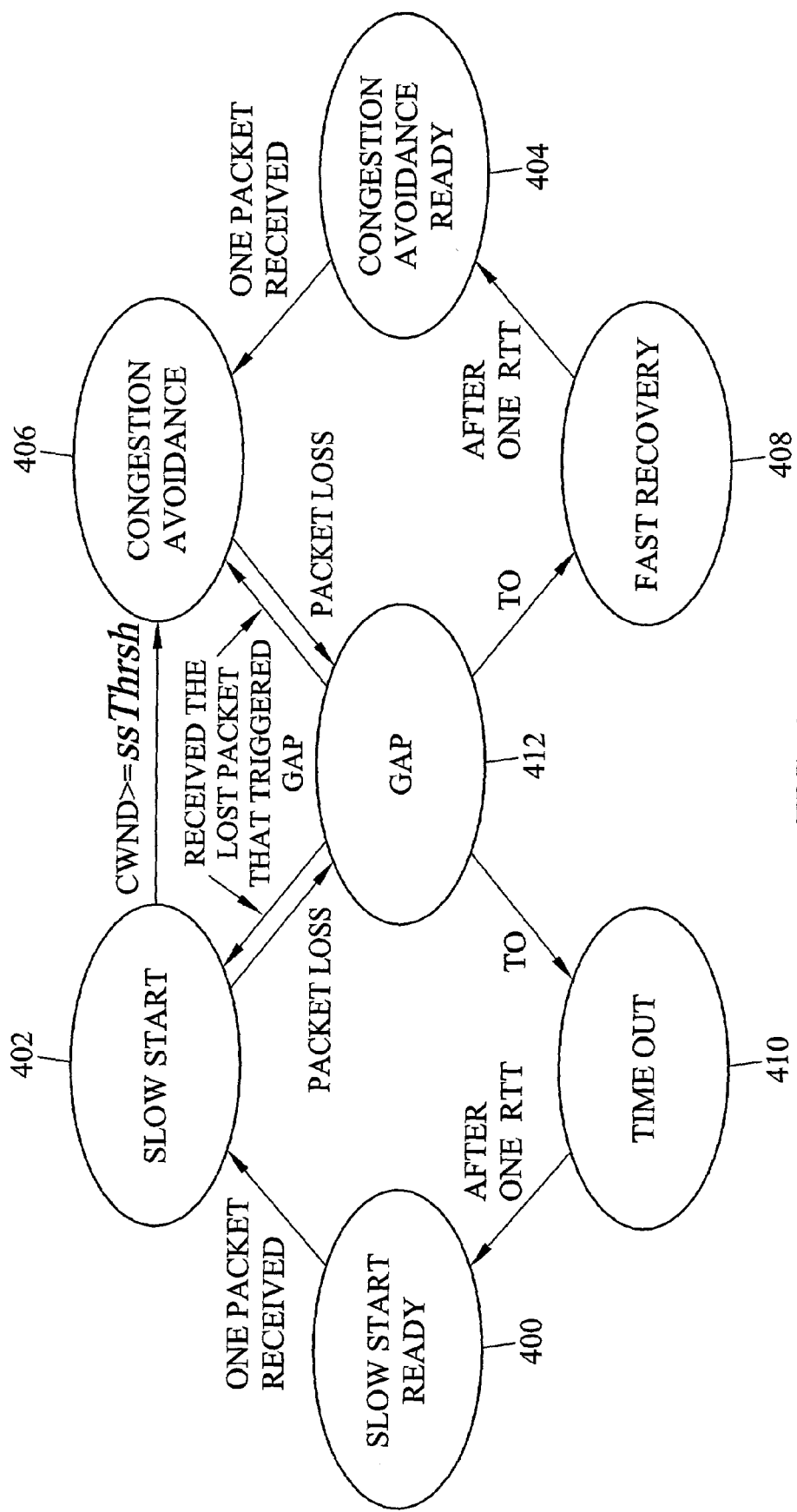
FIG. 4 is a state diagram illustrating a TEAR state machine according to an embodiment of the present invention.

According to one embodiment of the present invention, the TEAR protocol includes seven states. These states are illustrated in FIG. 4. In FIG. 4, states of the TEAR protocol include a SLOW-START-READY state 400, a SLOW-START state 402, a CONGESTION-AVOIDANCE-READY state 404, a CONGESTION-AVOIDANCE state 406, a FAST-RECOVERY state 408, a TIMEOUT state, and a GAP state 412. SLOW-START, CONGESTION-AVOIDANCE, FAST-RECOVERY, and TIMEOUT corresponds to the states of TCP during slow-start, congestion avoidance, fast recovery, and timeout, respectively. SLOW-START-READY, CONGESTION-AVOIDANCE-READY, and GAP are intermediary states for running the window adjustment protocol at the receiver.

The first round begins at the beginning of a transmission session, and TEAR receiver 102 initializes itself to SLOW-START-READY state 400. Initially cwnd is set to 1. A variable ssThrsh is set to a default value larger than 2. TEAR receiver 102 uses the ssThrsh variable to transit the protocol state from SLOW-START state 402 to CONGESTION-AVOIDANCE state 406. When receiving the first data packet, the second round begins and the state is changed to SLOW-START state 402. During the CONGESTION-AVOIDANCE or SLOW-START states 402 or 406, a round ends only when the ⌊lastCwnd⌋ number of packets are received from the beginning of that round. LastCwnd is the value of cwnd at the end of the previous round. A new round also begins when the state is changed to CONGESTION-AVOIDANCE-READY state 404 or SLOW-START-READY state 400. Now new round starts in the GAP, FAST-RECOVERY, or TIMEOUT states 408, 410, or 412.

TEAR Increase Window Algorithm

A packet is considered by a TEAR receiver to be received in sequence if the difference between the sequence number of that packet and that of its last received packet is exactly one. cwnd is incremented when a new packet is received in sequence at the CONGESTION-AVOIDANCE state 406 or SLOW-START state 402. cwnd is also incremented when TEAR receiver 102 enters the CONGESTION-AVOIDANCE state 406 or SLOW-START state 402. When a packet is received in CONGESTION-AVOIDANCE state 406 or when the state is changed to CONGESTION-AVOIDANCE state 406, cwnd is incremented by 1/lastCwnd. This emulates TCP window increase during congestion avoidance. When a packet is received in sequence in the SLOW-START state or when the state is changed to SLOW-START, cwnd is incremented by one for each received packet. This emulates TCP window increase during slow start. At the beginning of each round, lastCwnd is updated to the value of cwnd to be used in computing the next round's increment. When an updated cwnd is larger than ssThrsh in SLOW-START state 402, the state is changed to CONGESTION-AVOIDANCE state 406.

TEAR Decrease Window Algorithm

If the last packet received has a sequence number $l$, when a new packet received has a sequence number larger than $l+1$ (i.e., it is not in sequence), and the state is SLOW-START or CONGESTION-AVOIDANCE, TEAR receiver 102 transitions to GAP state 412 (i.e., a packet loss is detected). During the GAP state, cwnd is not modified. GAP state 412 is an intermediary state where TEAR receiver 102 determines whether the losses are for timeout or triple duplicate acknowledgment events. In TCP, when a packet loss occurs, the sender either does not receive any acknowledgment or receives only duplicate acknowledgments and during this time.

Fast Recovery

In TCP, packets received after a packet loss trigger a duplicate acknowledgment. Thus, the reception of three packets after a loss will trigger three duplicate acknowledgments in TCP (assuming no delayed acknowledgment). If these acknowledgments are received before the timeout, the TCP sender enters the fast recovery phase. Note that in TCP (SACK) at most lastCwnd−1 packets are transmitted after the transmission of the packet that is lost. Emulating this behavior, TEAR receiver 102 enters FAST-RECOVERY state 408 from GAP state 412 when at least two packets are received before receiving any packet with sequence number larger than $l$+lastCwnd. In addition, these packets must be received within a $T_{timeout}$ period after the reception of packet/(the last packet received in sequence before GAP state 412). $T_{timeout}$ is an estimated time for lastCwnd packets to arrive, and is defined below.

Figure 5:
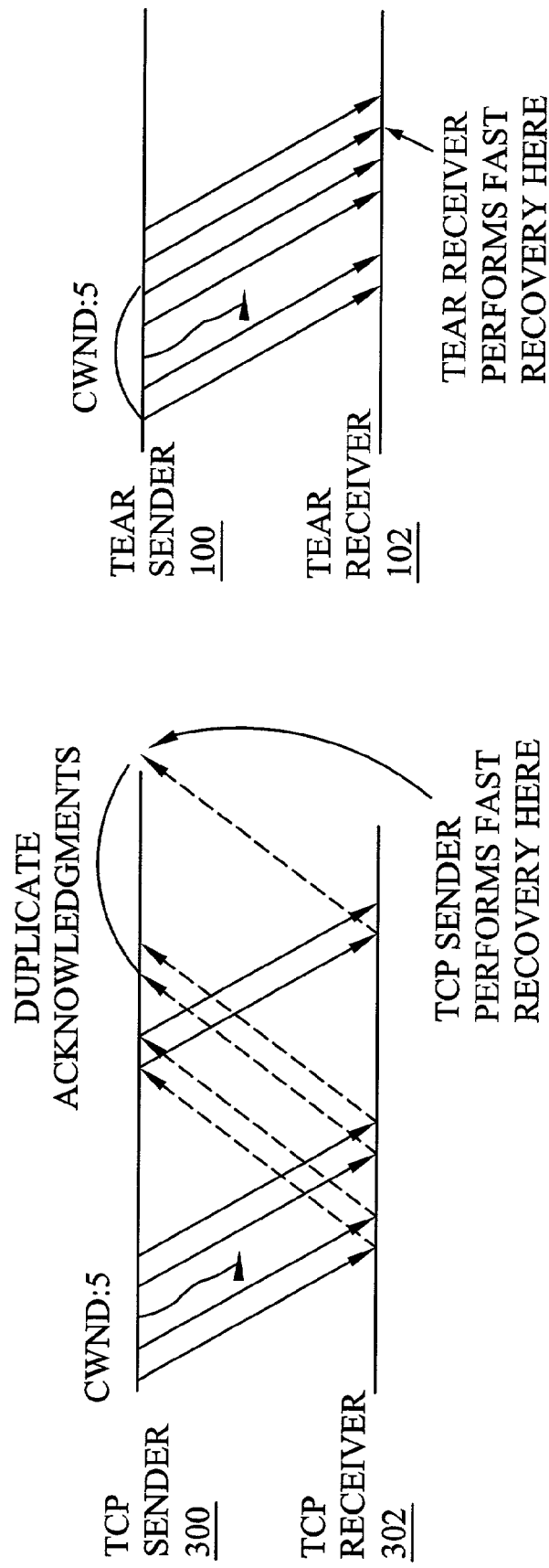
FIGS. 5A and 5B are packet flow diagrams respectively illustrating fast recovery performed by a conventional TCP sender and a TEAR receiver according to an embodiment of the present invention.

FIGS. 5A and 5B respectively illustrate TCP fast recovery and fast recovery emulated by a TEAR receiver according to an embodiment of the present invention. Referring to FIG. 5A, TCP sender 300 sends a sequence of packets to TCP receiver 302. One packet in the sequence is lost. Because TCP receiver 302 receives an out of sequence packet, TCP receiver sends duplicate acknowledgments to TCP sender 300. TCP sender 300 retransmits the lost packet and performs fast recovery.

Referring to FIG. 5B, TEAR sender 100 sends packets to TEAR receiver 102. One of the packets is lost. When TEAR receiver 102 receives three out of sequence packets, TEAR receiver 102 enters the fast recovery phase, thus emulating the behavior of a TCP sender.

Referring back to FIG. 4, in GAP state 412, if packet $l$+1 is received, TEAR receiver 102 returns to the last state before GAP state 412, and cwnd is updated according to the increase algorithm. This happens when packet $l$+1 is recorded in the network. All those packets received before the reception of recorded packet $l$+1, but have a higher sequence number than $l$+1 are considered to be received at once when the state is resumed from GAP state 412. Thus, cwnd is incremented for each of those packets if there is no missing packets. If there is any packet i whose next packet in sequence is not received, but some subsequent packets to i (i.e., some packet is missing) are received, then the state is changed to a new GAP state. At this moment, the last packet received before entering this GAP state is considered to be packet i (i.e., $l$=i). $T_{timeout}$ is also counted from the reception time of packet i.

In FAST-RECOVERY state 412, TEAR receiver 102 waits for an RTT period. All the packets received during this RTT period are ignored. This mimics the TCP behavior during packet losses; it reduces its window only once for all the losses of packets transmitted within the same congestion window. This waiting can be achieved by setting a timer for the current estimate of RTT. To be more accurate, TEAR receiver 102 can send a feedback packet when a loss occurs, and TEAR receiver 102 can wait until the sender acknowledges the reception of the feedback.

At the end of that RTT period, the state is changed to CONGESTION-AVOIDANCE-READY state 404 and a new round begins. Thus, the round before this new round spans from the beginning of the last round and to the end of the RTT period. During the last round, cwnd is not changed. As the new round begins in CONGESTION-AVOIDANCE-READY state 404, TEAR receiver 102 reduces cwnd and lastCwnd to one half of the value of cwnd at that time. When a new packet is received after this state, the state is changed to CONGESTION-AVOIDANCE state 406 and cwnd is incremented according to the increase algorithm. At least one packet must be received after the losses triggered FAST-RECOVERY. This ensures that before cwnd is increased again, the network state has recovered from the losses.

Timeout

If TEAR receiver 102 does not enter FAST-RECOVERY state 408 from GAP state 412 until $T_{timeout}$ time has past since the reception of packet $l$, it enters TIMEOUT state 410. In addition, if no packet is not received before $T_{timeout}$ after the transition to CONGESTION-AVOIDANCE-READY state 404, then the receiver enters TIMEOUT state 410. $T_{timeout}$ is computed as follows:

$$T_{timeout} = T_{interarrival} * lastCwnd * 2DEV \quad (1)$$

$T_{interarrival}$ is the inter-packet transmission time and can be computed by taking the inverse of the current transmission rate. This information is embedded in the packet header by the sender. DEV is the deviation in RTT estimates, which is computed in the same way as in TCP by the sender from feedback. This deviation can be also be computed by taking deviation in the time difference from the sending and receiving timestamps, and multiplying the deviation by $\sqrt{2}$. This technique is useful when direct feedback from the receiver to the sender is not allowed for scalability reasons, such as in multicast.

This timeout period is different from TCP's timeout period. TCP enters timeout when a packet is not acknowledged until its retransmission timer expires. If fast retransmit and recovery are triggered and recover the packet before that event, the timeout is avoided. Typically, retransmission timers are set to a value large enough so that triple duplicate acknowledgments can be received before the timeout (if they are indeed sent). Thus, when fast retransmit and recovery are possible, the timer value are large enough to allow it.

In TEAR, since no acknowledgment is sent, timeout must be detected at the receiver. This makes detecting a timeout difficult. However, since TEAR receiver 102 can detect packet losses, it can obtain some hints for timeout from packet arrivals. For instance, in TCP, prior to the detection of fast recovery, the sender transmits exactly lastCwnd−1 packets after the first packet that is lost to cause GAP. Therefore, if TEAR receiver 102 gets less than three packets after a packet loss until it learns that lastCwnd−1 packets are sent by the sender after the lost packet was sent, it knows that fast recovery will not be triggered if such situation occurs in TCP. $T_{timeout}$ is the time to allow at least lastCwnd−1 packets to arrive at TEAR receiver 102. An additional 2×DEV per packet interval may be allowed to account for delay jitters in the forward path. TCP uses 4×DEV for jitters in round trip times.

After entering TIMEOUT state 410, TEAR receiver 102 again waits for an RTT period to ignore packets lost during the same loss burst that caused the timeout. At the end of the RTT period, the state is changed to SLOW-START-READY state 400, ssThrsh is set to one half of min {cwnd}, cwnd and lastCwnd are set to 1, and $T_{timeout}$ is doubled. A new round begins at this time. The last round spans from the beginning of the last round to the end of the current RTT period. cwnd is not changed during this last round. TEAR receiver 102 waits to receive a new packet before entering SLOW-START state 402 from SLOW-START-READY state 400. SLOW-START-READY state 400 is required for TEAR receiver 102 to know the sequence number of the next packet to be received. If no packet arrives before $T_{timeout}$ after the transition to SLOW-START-READY state 400, TEAR receiver 102 enters TIMEOUT state 410 again. When entering SLOW-START, TEAR receiver 102 resets $T_{timeout}$ to the value in Equation 1.

Rate Calculation

At the end of each round, TEAR receiver 102 records the current values of cwnd and RTT to a history array if that round does not involve TIMEOUT state 410; otherwise, it records the current values of cwnd and RTO. RTO is defined to be SRTT+4DEV, where SRTT is an exponentially weighted moving average of RTT. These values are used to estimate TCP-friendly rates.

Figure 6:
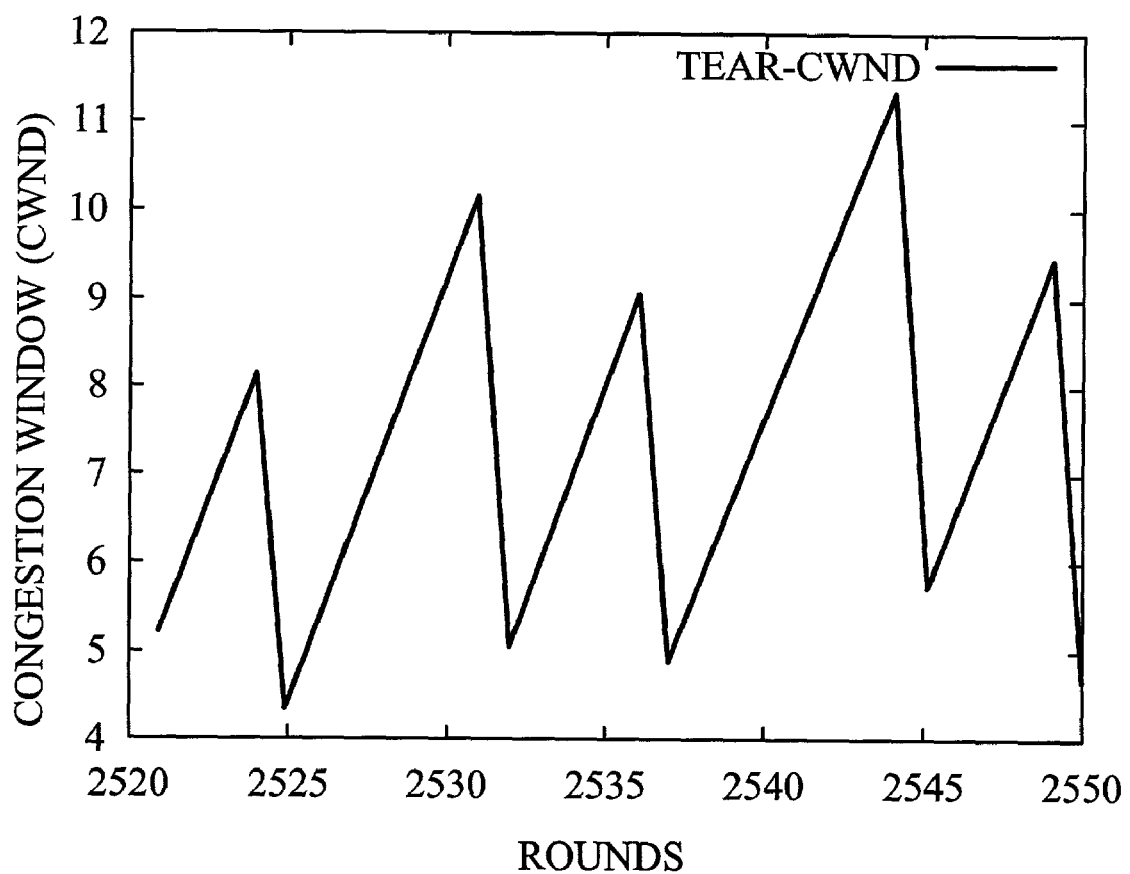
FIG. 6 is a graph illustrating calculation of congestion window size by a TEAR receiver according to an embodiment of the present invention.

TCP's transmission rate can be computed by dividing cwnd by RTT. However, TEAR cannot set its transmission rate to this value (computed for each round) because it will cause the level of rate fluctuations as TCP which are preferably avoided. FIG. 6 illustrates exemplary values of cwnd over rounds for a typical run of TEAR. In FIG. 6, the horizontal axis represents time in milliseconds. The vertical axis represents the congestion window size in packets. The saw-tooth-like pattern indicates the additive increase and multiplicative decrease (AIMD) behavior of TCP window management. From the figure, it can be seen that although instantaneous rates would be highly oscillating, long-term throughput would be fairly stable. The idea is to set the TEAR transmission rate to an averaged rate over some long-term period T.

One issue to be determined is how large to set T. If T is set too small, the rate would fluctuate too much. If T is set too large, then rate adjustment would be too insensitive to network congestion, T will almost always be larger than the length of one "saw tooth." If it less than that, it will show the same fluctuation pattern as TCP. An epoch defines one "saw tooth". An epoch is a period that begins either when TEAR receiver 102 enters SLOW-START state 402 or CONGESTION-AVOIDANCE state 406 or at the beginning of the transmission session. When a new epoch starts, the current epoch ends which happens when TEAR receiver 102 enters SLOW-START state 402 or CONGESTION-AVOIDANCE state 406 (i.e., after a packet loss).

Suppose that the current epoch is the kth epoch. At the end of each round, TEAR receiver 102 divides the sum of all the cwnd samples recorded in the kth epoch by the sum of the RTTs or RTO recorded in that epoch (there can be only one RTO in an epoch). The result is referred herein as the rate sample of epoch k. Setting the rate to a rate sample at the end of each epoch would result in a smoother rate adjustment. However, some unnecessary rate fluctuations might still be present because some rate samples may not be representative of the actual fair share rate due to noise in loss patterns. In the current environments, loss patterns are highly noisy. Since the end of an epoch is determined by packet losses, if T is set to be the size of one epoch, the estimated rate would also be subject to the noise. It may be necessary to look further back than one epoch.

To filter out the noise, a weighted average over rate samples taken over several W epochs in the past may be calculated. At the end of each round, TEAR receiver 102 computes a weighted average of the last W rate samples taken at the end of each of the last W epochs, where W is an integer. If the current epoch k is in process, then that sample is used only if adding the current sample in the averaging increases the current rate. This is because while the current epoch is in progress, its rate sample can be too small. Until the epoch becomes sufficiently large or it ends (with packet losses), that sample is not reliable, so the sample is ignored. This calculation may be performed as follows: If the kth epoch is in progress, then TEAR receiver 102 takes a weighted average from kth to k−W−1th epochs. The larger of the two averages multiplied by the packet size P is taken as a candidate for a feedback rate to the sender. This candidate is referred to herein as $f_{cand}$. If there has been less than W epochs (i.e., k<W), then the missing samples are set to 0.

In one exemplary implementation, W is chosen to be 8, and weights illustrated in Table 1 shown below may be applied.

TABLE 1

Epochs and Corresponding Weights

| Epoch | k | k-1 | k-2 | k-3 | k-4 | k-5 | k-6 | k-7 |
|---|---|---|---|---|---|---|---|---|
| Weight | 1/6 | 1/6 | 1/6 | 1/6 | 2/15 | 1/10 | 1/15 | 1/30 |

Other distribution functions, such as a Gaussian or exponential distribution may be used, and they provide a similar performance. W and the weights may be randomly selected. However, the weights are preferably selected such that the most recent samples are weighted more heavily.

Feedback

TEAR sender 100 sets its current transmission rate to the most recently received rate estimate from the receiver. If $f_{cand}$ is less than the previously reported rate, then the receiver reports $f_{cand}$ immediately to the sender. Otherwise, TEAR receiver 102 sends its rate estimate at the end of a feedback round. The duration of a feedback round is a parameter to the system. The rate estimate reported at the end of a feedback round is equal to $f_{cand}$ computed at that time.

Simulation Results

The simulation experiments described below designed to study the TCP-friendliness, fairness, and smoothness of TCP-based rate adjustment in a unicast environments. In all experiments, TCP-SACK flows and TEAR flows were run at the same time.

Figure 7:
FIG. 7 is a block diagram illustrating a test setup for testing the performance of TEAR according to an embodiment of the present invention.

The same experiments were conducted for TFRC. The default values of TFRC parameters are used which are shown below:

Agent/TFRC set packetSize_1000
Agent/TFRC set df_0.95; # decay factor for accurate RTT estimate
Agent/TFRC set tcp_tick_0.1;
Agent/TFRC set ndatapack_0; # Number of packets sent
Agent/TFRC set srtt_init_0; # Variables for tracking RTT
Agent/TFRC set rttvar_init_12
Agent/TFRC set rtxcur_init_6.0
Agent/TFRC set rttvar_exp_2
Agent/TFRC set T_SRTT_BITS 3
Agent/TFRC set T_RTTVAR_BITS 2
Agent/TFRC set InitRate_1000; # Initial send rate
Agent/TFRC set overhead_0; # If>), dither outgoing packets
Agent/TFRC set ssmult_2; # Rate of increase during slow-start:
Agent/TFRC set bval_1; # Value of B for TCP formula
Agent/TFRC set ca_1; # Enable Sqrt (RTT) congestion avoidance
Agent/TFRC set printStatus_0
Agent/TFRC set rate_0.0
Agent/TFRC set bval_1
Agent/TFRCSink set packetSize_40
Agent/TFRCSink set InitHistorySize_100000
Agent/TFRCSink set NumFeedback_1
Agent/TFRCSink set AdjustHistoryAfterSS_1
Agent/TFRCSink set NumSamples__1
Agent/TFRCSink set discount_1; # History Discounting
Agent/TFRCSink set printLoss_0
Agent/TFRCSink set smooth_1; # smoother Average Loss Interval FIG. 7 illustrates the symmetric network topology used in our experiments. In FIG. 7, nodes n0–n3 are computers connected via network connections. Each experiment was conducted with different values of following parameters: the bottleneck bandwidth, denoted as xx, (10 Mbps, 5 Mbps, 2.5 Mbps, 128 Kbps), the number of competing TCP flows (1, 2, 4, 8, 16) and the number of competing TEAR (or TFRC) flows (1, 2, 4, 6, 16), the router types (Drop Tail or RED) of the bottleneck link, the feedback latency (1 RTT, 1.5 RTTs, 4 RTTs, 10 RTTs). Link delays are fixed. The running time was set to 400 seconds, and each network flow was started with a one second interval between successive startups.

The complete results are illustrated in FIGS. 8A–18D. The figures plot the performance of TEAR and TFRC when competing with different numbers of TCP flows and their own flows (denoted x:y where x is the number of TEAR (or TFRC) flows, and y is the number of TCP flows).

Each figure shows instantaneous rate samples. For one TEAR or TFRC flow and the values of one TCP flow even though actual runs occurred with x TEAR flows and y TCP flows. TCP rates are sampled at every 100 ms interval by dividing the number of bytes sent over one interval by 100 ms. The black color also indicates the rate samples of TEAR or TFRC taken at every 100 ms interval. The green line shows the transmission rate taken whenever the rate is updated. The red line indicates the fair share.

Below, subsets of the results are highlighted to illustrate the performance comparison between TEAR and TFRC.

Fairness and TCP Friendliness

Figure 8A:
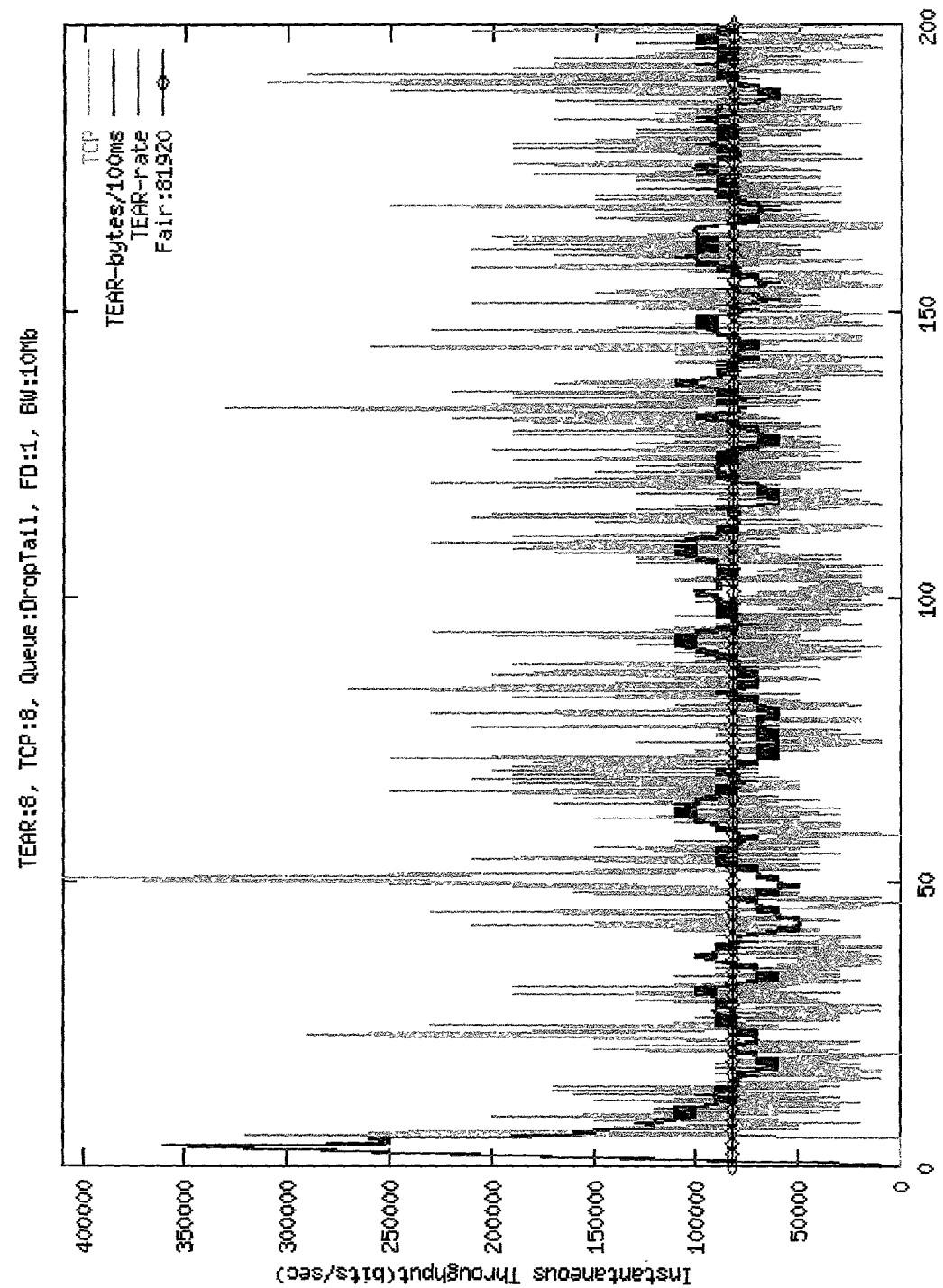
FIG. 8A is a graph of instantaneous throughput versus time for 8 TEAR flows, 8 TCP flows, a 10 megabit per second bottleneck, feedback every roundtrip time, and a droptail router.
Figure 8B:
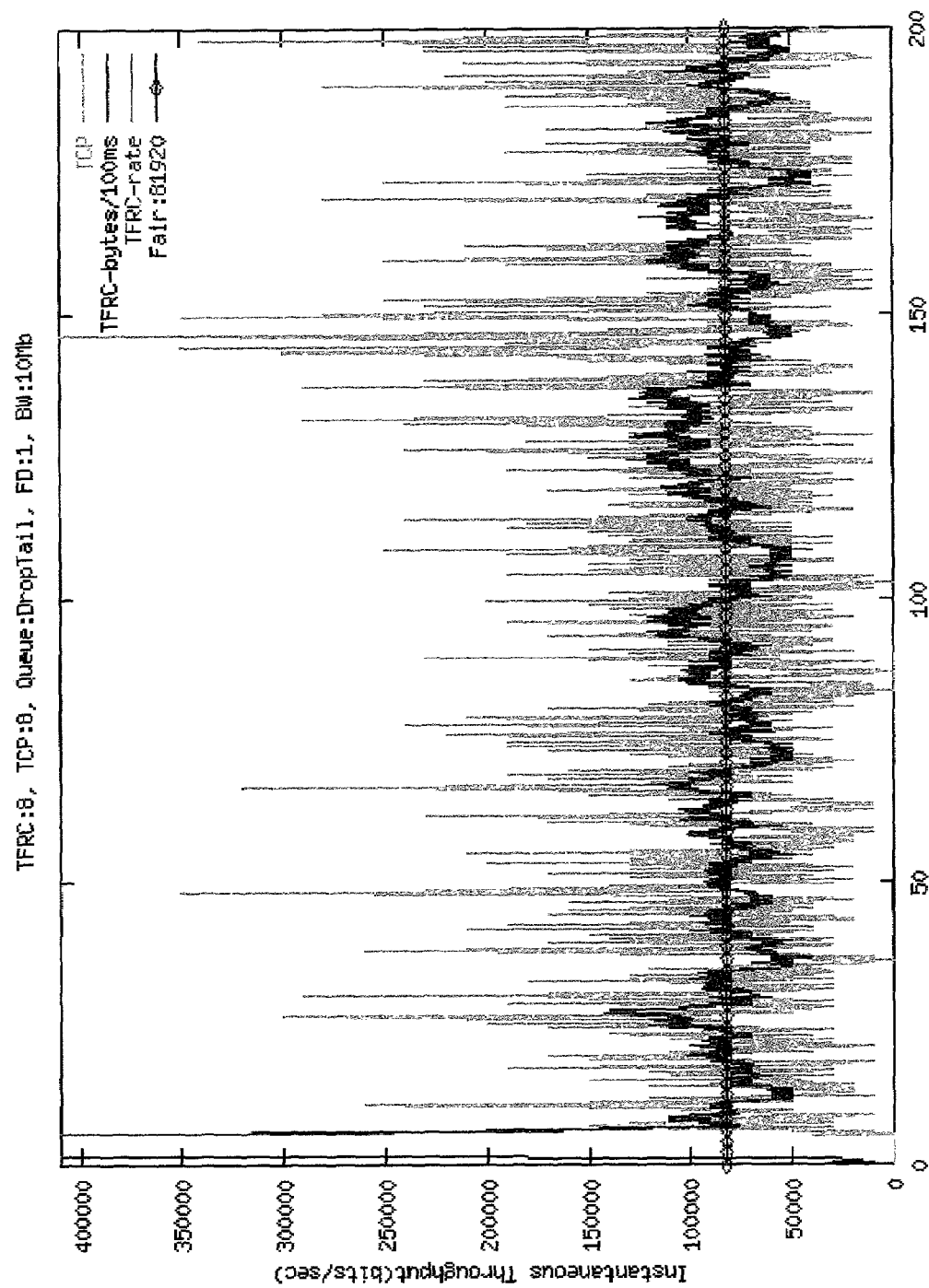
FIG. 8B is a graph of instantaneous throughput versus time for 8 TCP flows, 8 TEAR flows, a bottleneck of 10 megabits per second, feedback every 1.5 roundtrip times, and a droptail router.

FIGS. 8A and 8B show the instantaneous rate samples of TCP and TEAR, and TCP and TFRC respectively with the bottleneck bandwidth 10 Mbps, a droptail router, and a ratio of flows equal to 8:8. Both TEAR and TFRC rates follow the fair share very well.

Figure 9A:
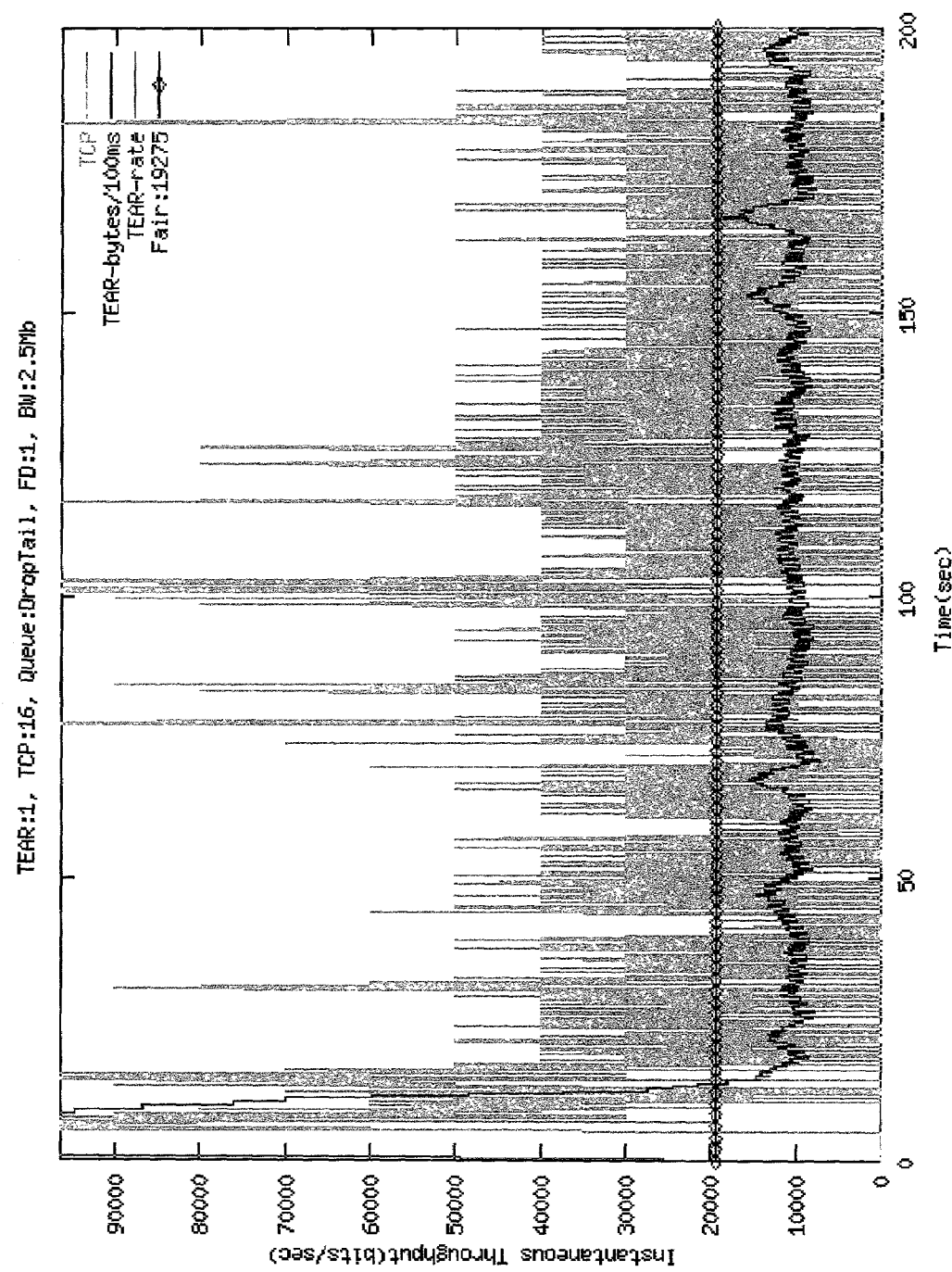
FIG. 9A is a graph of instantaneous throughput versus time for 1 TEAR flow, 16 TCP flows, a bottleneck of 2.5 megabits per second, feedback every 1.5 roundtrip times, and a droptail router.
Figure 9B:
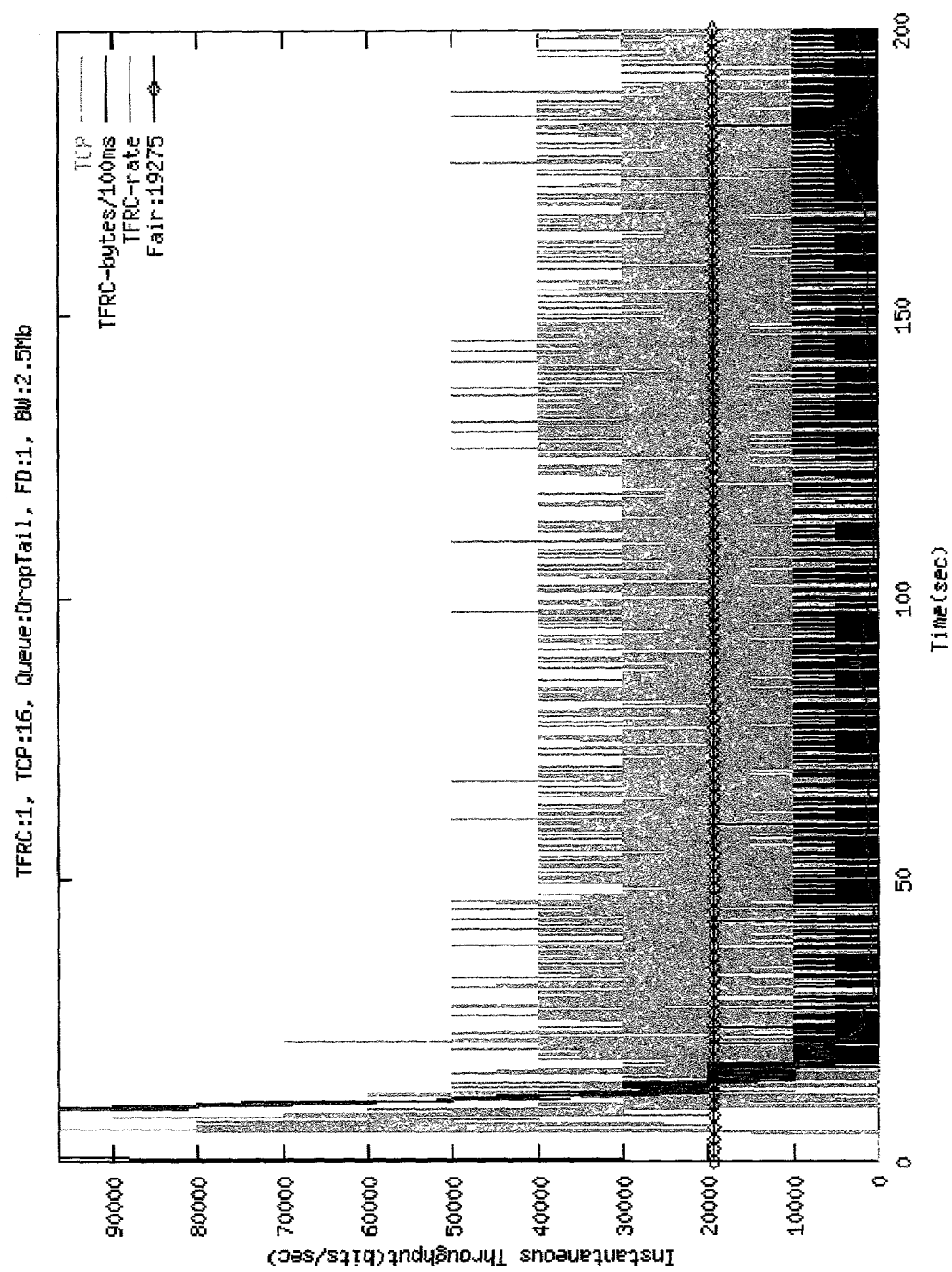
FIG. 9B is a graph of instantaneous throughput versus time for 1 TRFC flow, 16 TCP flows, a bottleneck of 2.5 megabits per second, feedback every 1.5 roundtrip times, and a droptail router.

FIGS. 9A and 9B are from the run with a bottleneck bandwidth 2.5 Mbps, a droptail router, and a ratio of flows equal to 1:16. TEAR uses less than the fair share (about one half). TFRC's rate drops to zero.

Figure 10A:
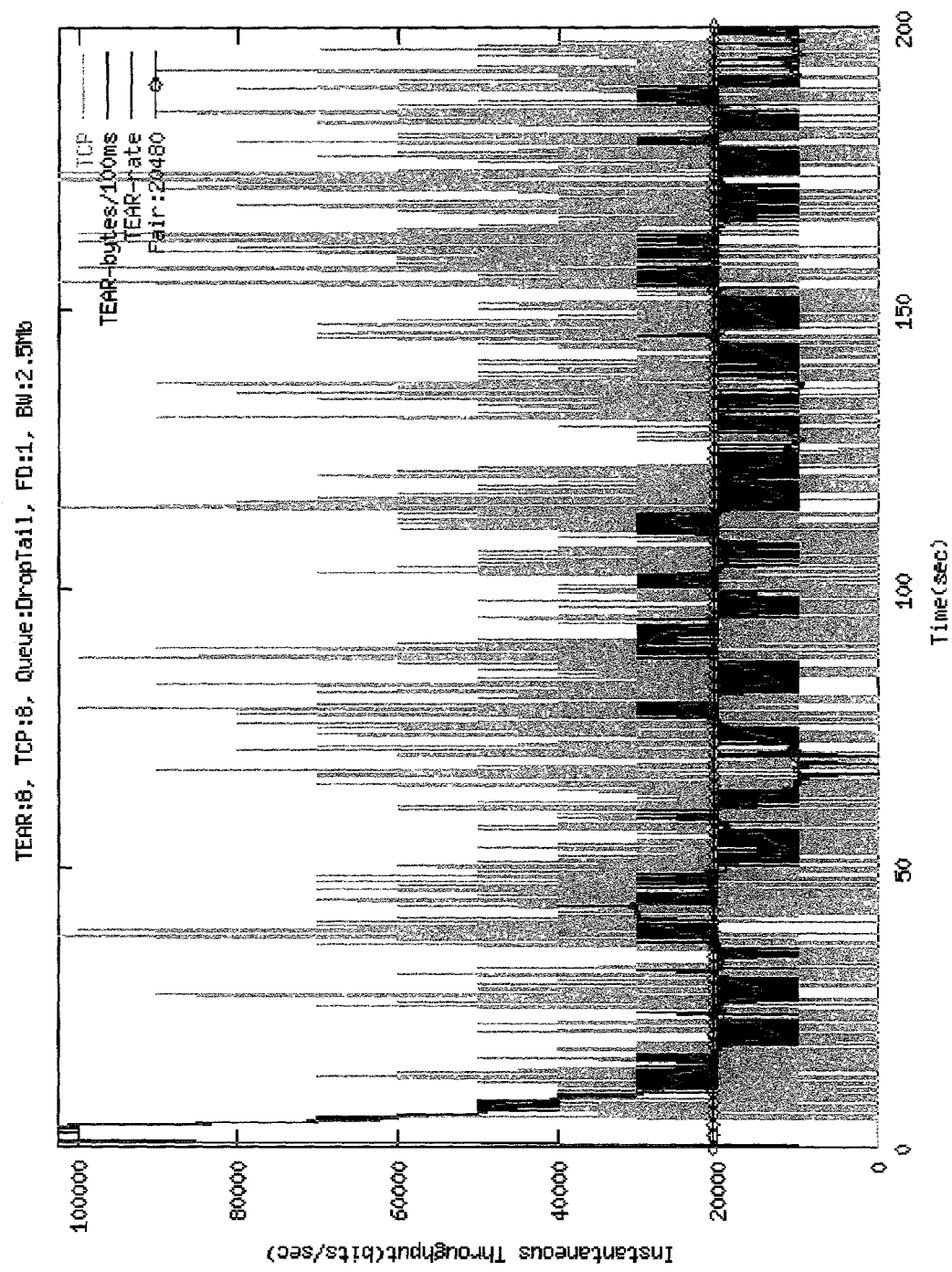
FIG. 10A is a graph of instantaneous throughput versus time for 8 TCP flows, 8 TEAR flows, feedback every 1 roundtrip time, a bottleneck of 2.5 megabits per second, and a droptail router.
Figure 10B:
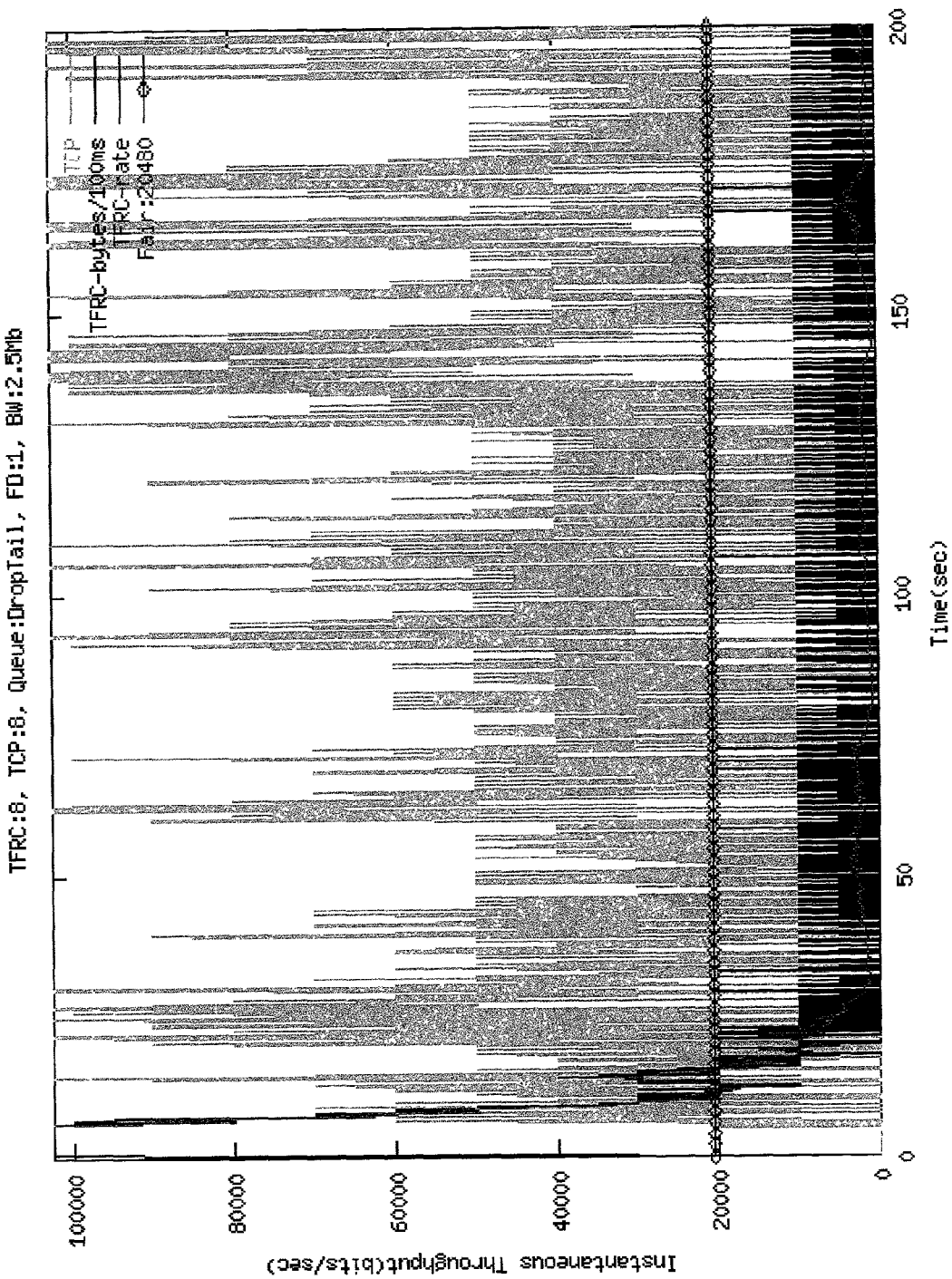
FIG. 10B is a graph of instantaneous throughput versus time for 8 TCP flows, 8 TFRC flows, feedback every 1.5 roundtrip times, a bottleneck of 2.5 megabits per second, and a droptail router.

FIGS. 10A and 10B are from the run with a bottleneck bandwidth 2.5 Mbps, a droptail router, and a ratio of flows equal to 8:8. TEAR uses slightly less than the fair share. TFRC's rate drops to zero.

Figure 11A:
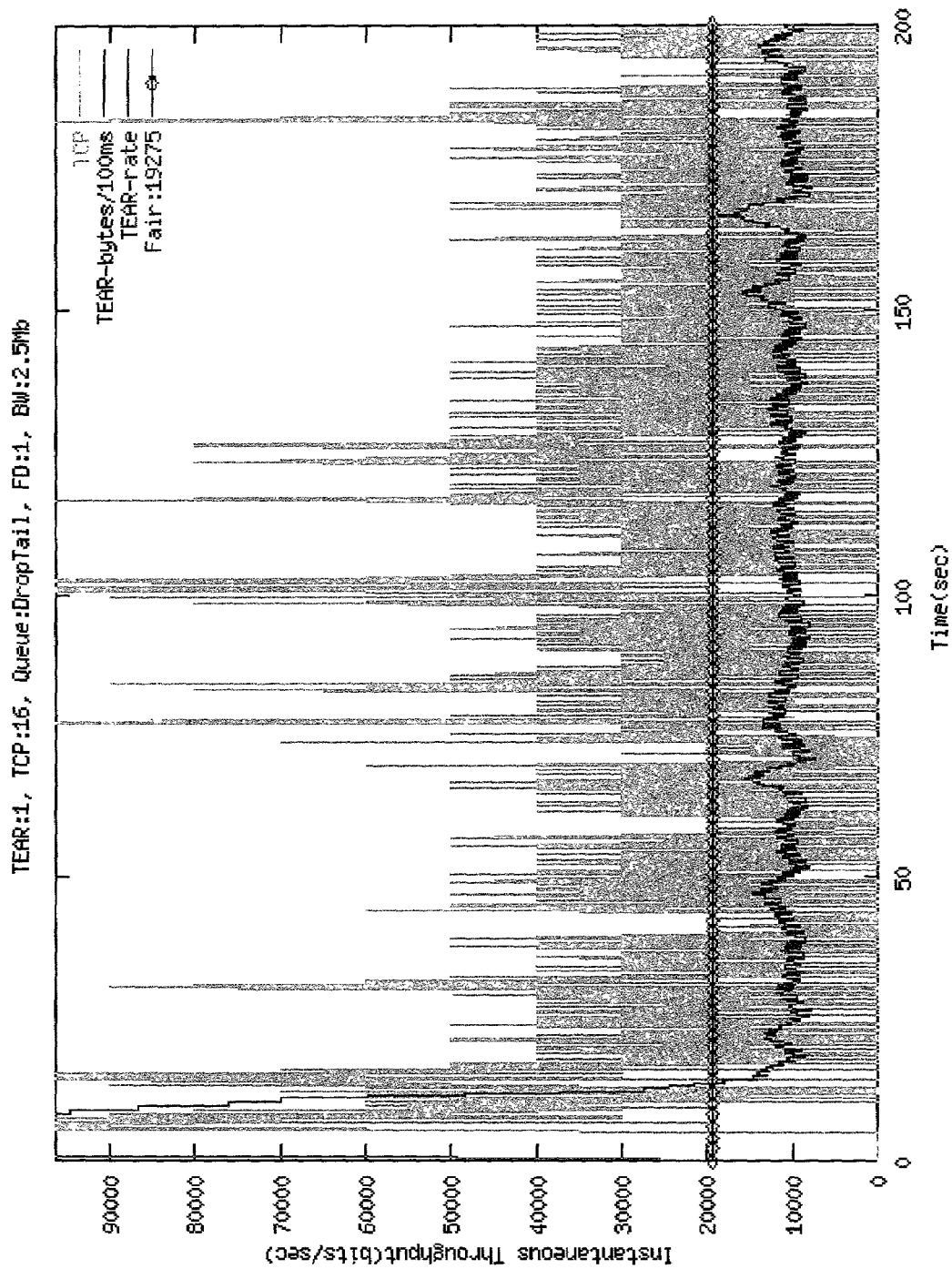
FIG. 11A is a graph of instantaneous throughput versus time for 1 TFRC flow, 16 TCP flows, feedback every 1 roundtrip time, a RED router, and a bottleneck of 2.5 megabits per second.
Figure 11B:
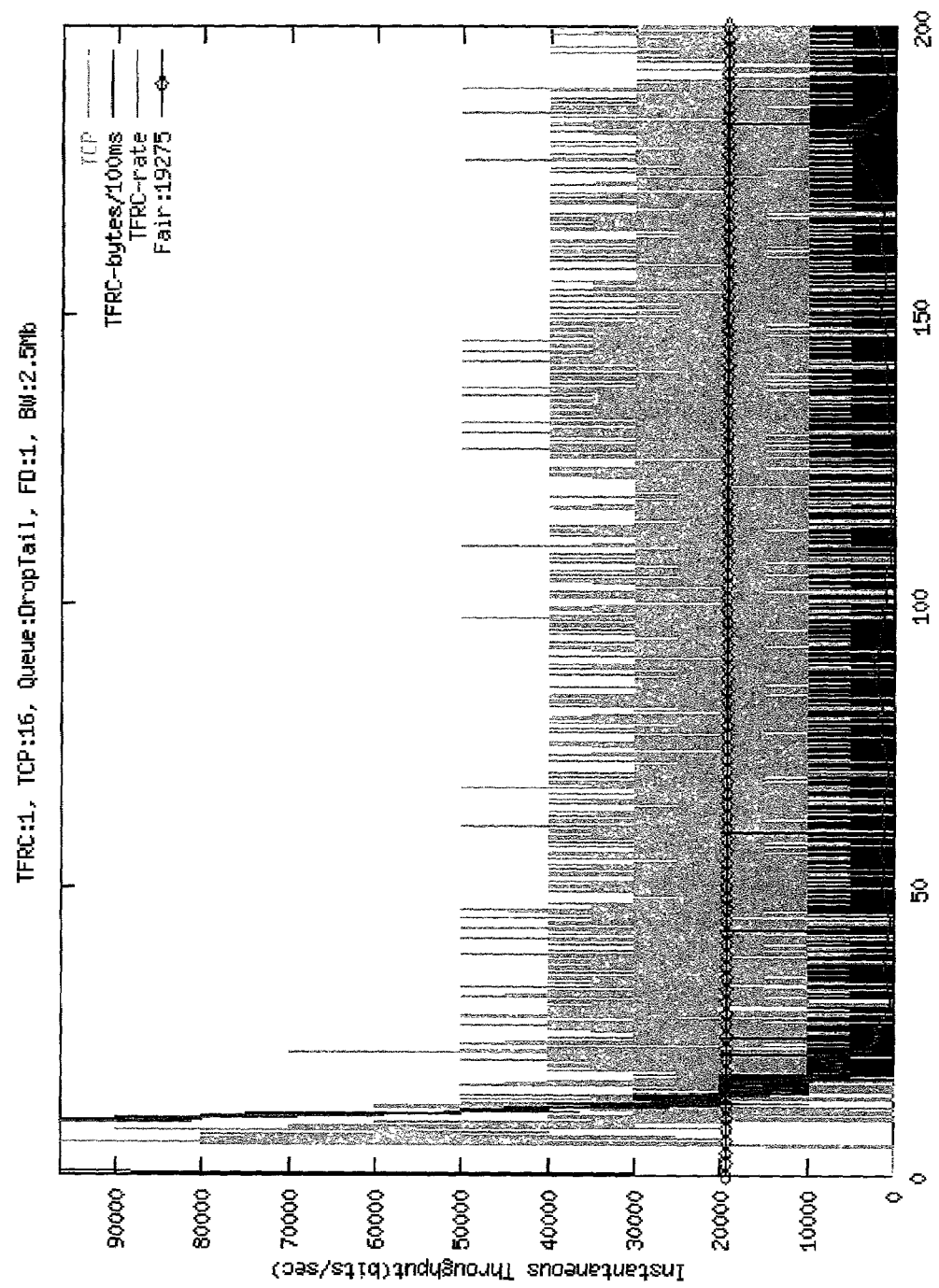
FIG. 11B is a graph of instantaneous throughput versus time for 1 TEAR flow, 16 TCP flows, a bottleneck of 2.5 megabits per second, a RED router, and feedback every 1 roundtrip time.

FIGS. 11A and 11B are from the run with a bottleneck bandwidth 2.5 Mbps, a RED router, and a ratio of flows equal to 1:16. TEAR's rate follows the fair share pretty well. TFRC's rate is still very low, and sometimes drops to zero.

Figure 12A:
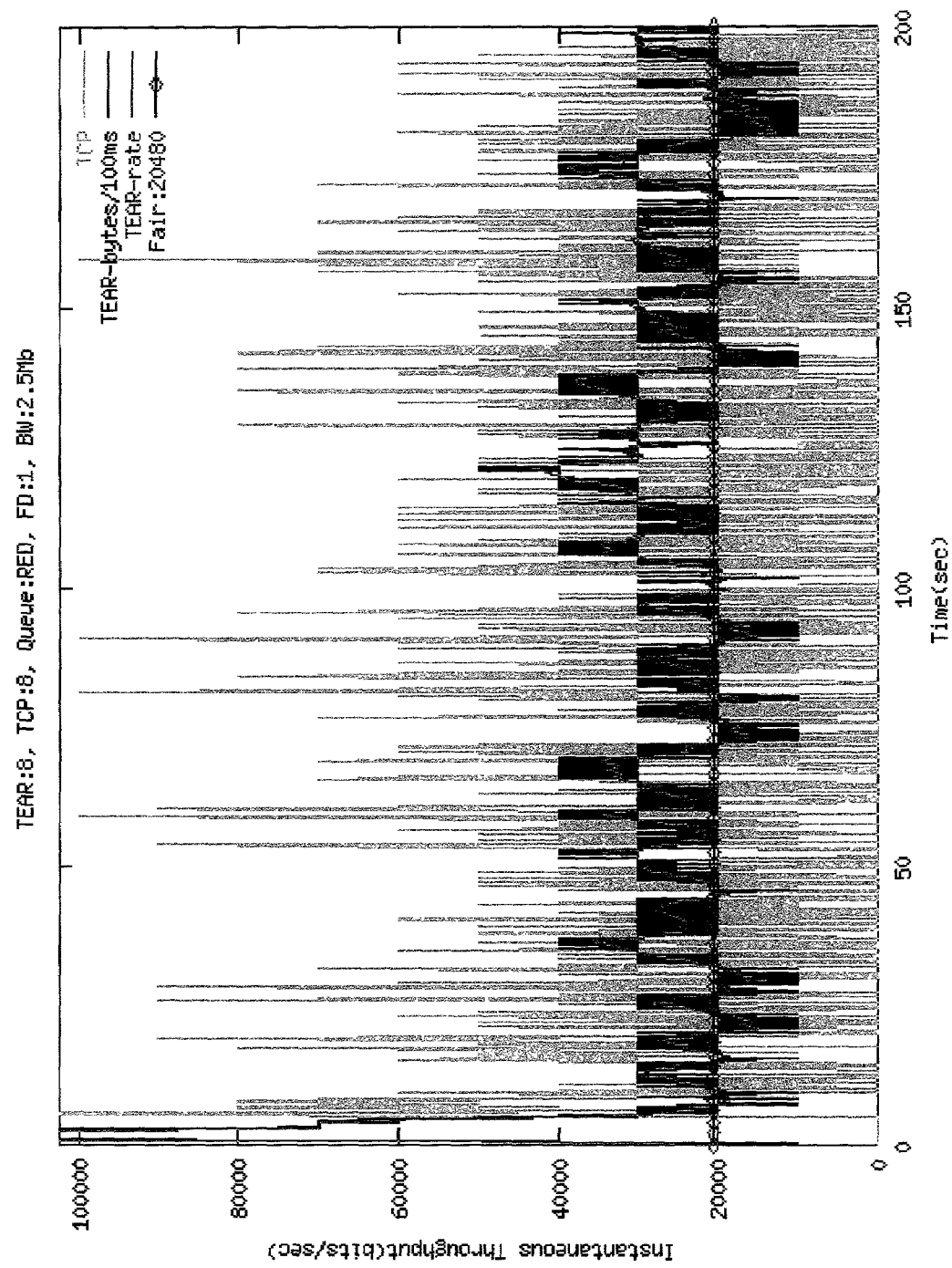
FIG. 12A is a graph of instantaneous throughput versus time for 8 TCP flows, 8 TEAR flows, feedback every 1 roundtrip time, a bottleneck of 2.5 megabits per second, and a RED router.
Figure 12B:
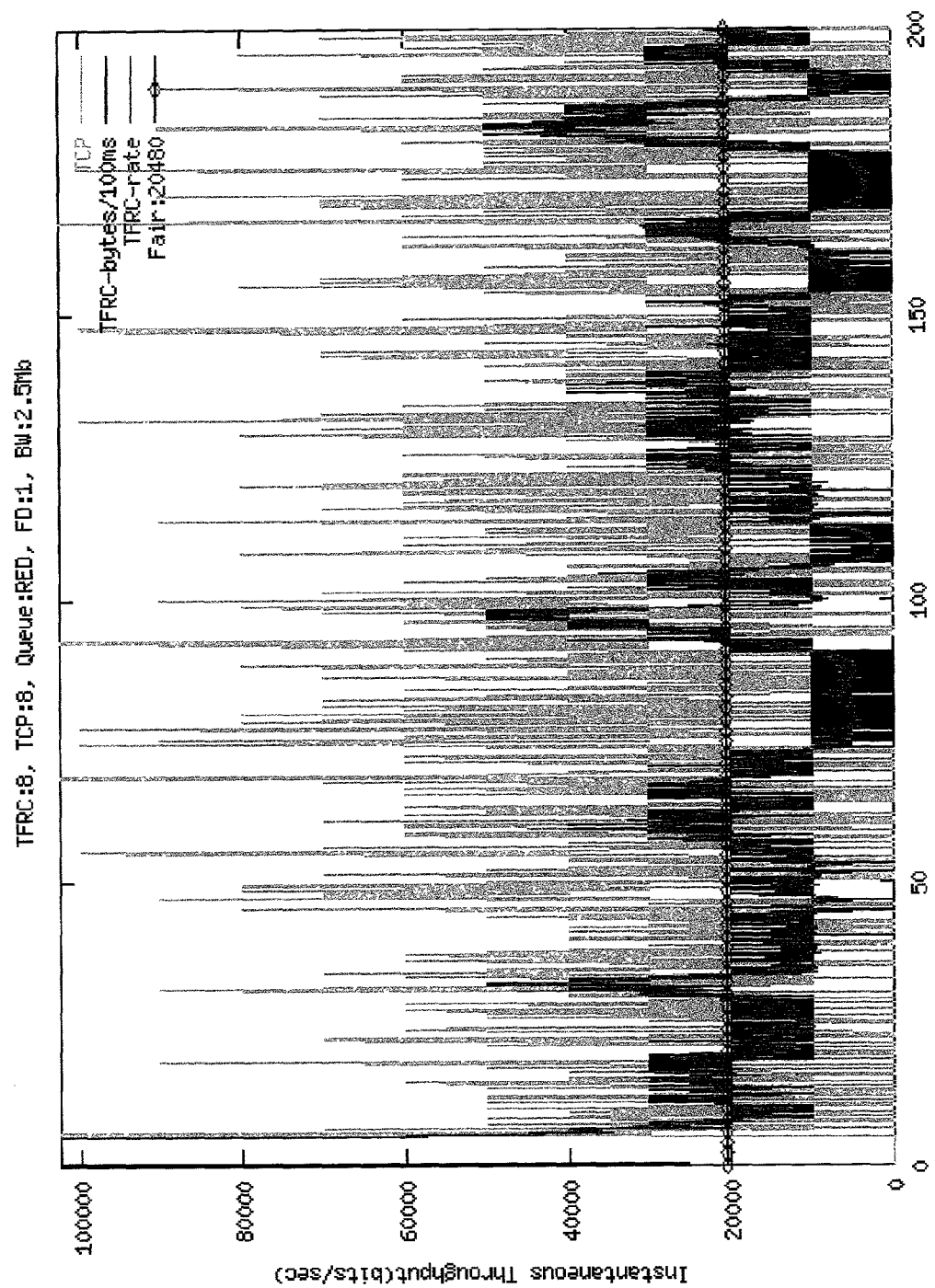
FIG. 12B is a graph of instantaneous throughput versus time for 8 TCP flows, 8 TFRC flows, feedback every 1.5 roundtrip times, a bottleneck of 2.5 megabits per second, and a RED router.

FIGS. 12A and 12B are from the run with a bottleneck bandwidth 2.5 Mbps, the RED router, and a ratio of flows equal to 8:8. Both TEAR's rate and TFRC's rate oscillate around the fair share. (although TFRC's rate sometimes gets very low).

Rate Fluctuations or Smoothness

In FIGS. 8A–9B, both TEAR and TFRC show much fewer and lower fluctuations than TCP (in the order of magnitude). However, TFRC tends to show a little more and larger fluctuations.

FIGS. 12A and 12B are from the run with a bottleneck bandwidth 2.5 Mbps, a RED router, and a ratio of flows equal to 1:1. TEAR shows very stable rate transitions around the fair share. However, TFRC shows almost as many and as much fluctuations as TCP. When a droptail router is used, the phenomenon gets worse.

Figure 13A:
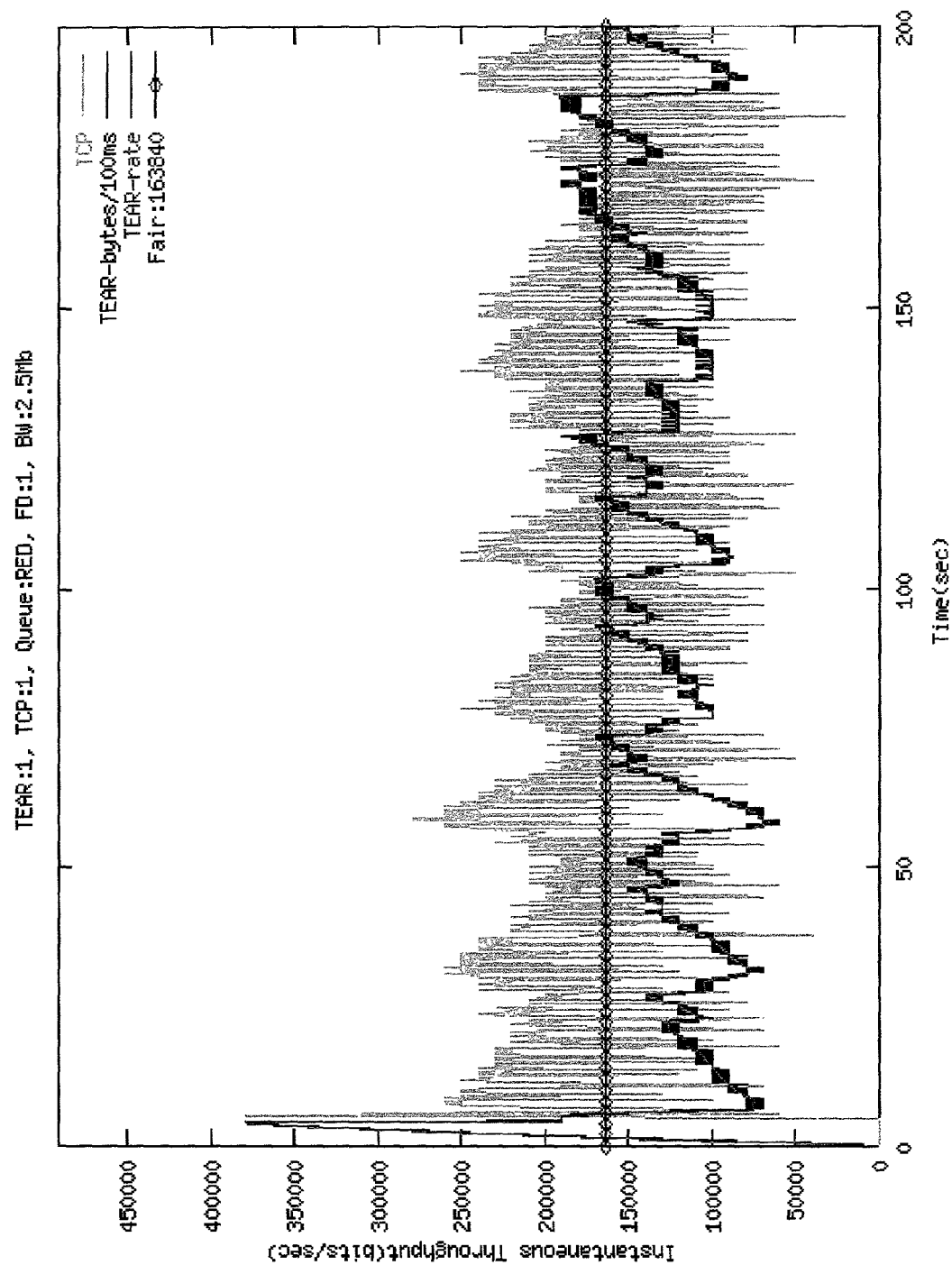
FIG. 13A is a graph of instantaneous throughput versus time for 1 TEAR flow, 1 TCP flow, a bottleneck of 2.5 megabits per second, a droptail router, and feedback every roundtrip time.
Figure 13B:
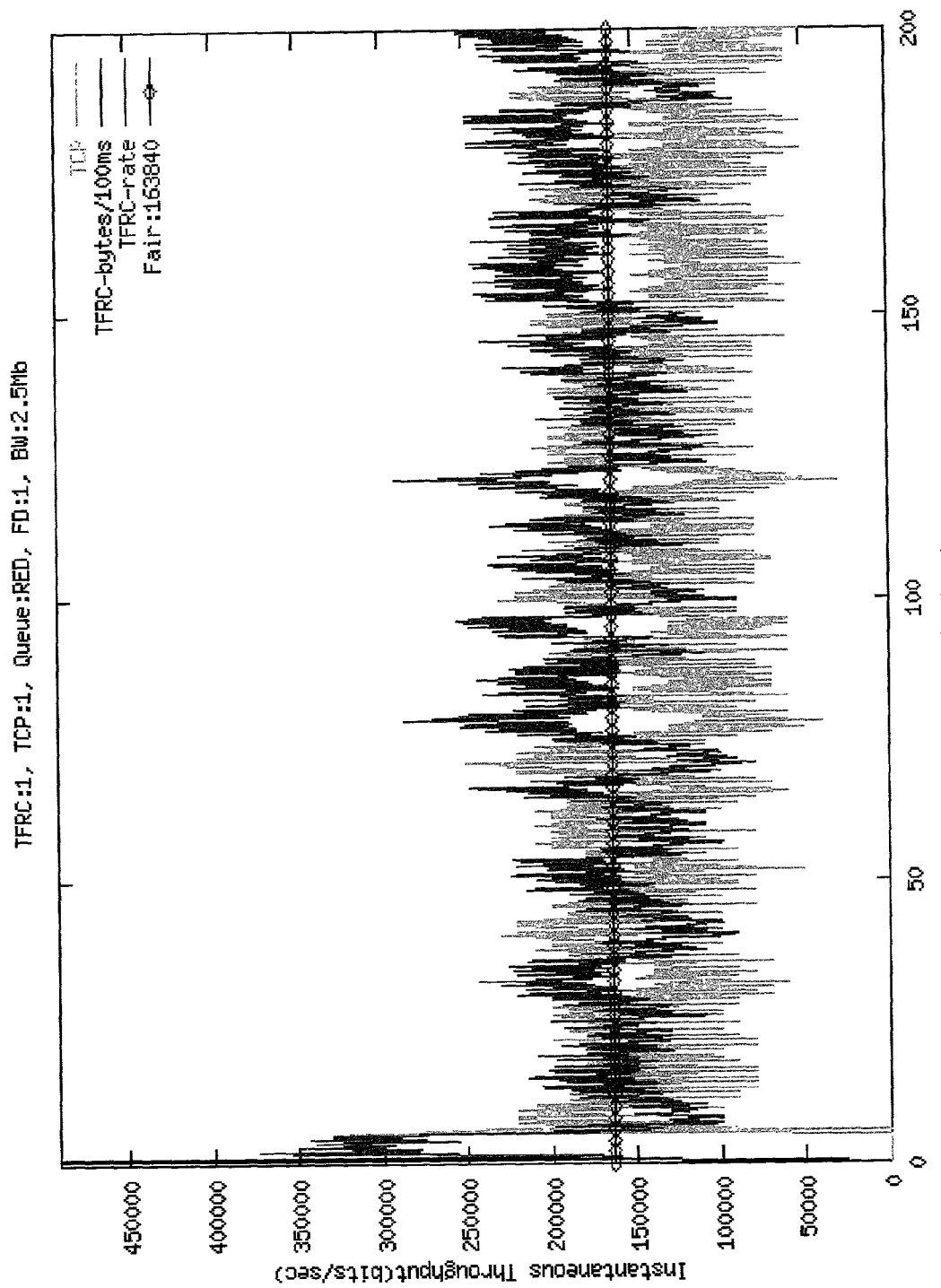
FIG. 13B is a graph of instantaneous throughput versus time for 1 TFRC flow, 1 TCP flow, a bottleneck of 2.5 megabits per second, a droptail router, and feedback every 1 roundtrip time.

FIGS. 13A and 13B are from a run with a bottleneck of 2.5 megabits per second, a droptail router, feedback every 1 roundtrip time or a flow ratio of 1:1. In particular, FIG. 13A illustrates the case when 1 TEAR flow and 1 TCP flow occur simultaneously and FIG. 13B illustrates the case where 1 TFRC flow and 1 TCP occur simultaneously.

Figure 14A:
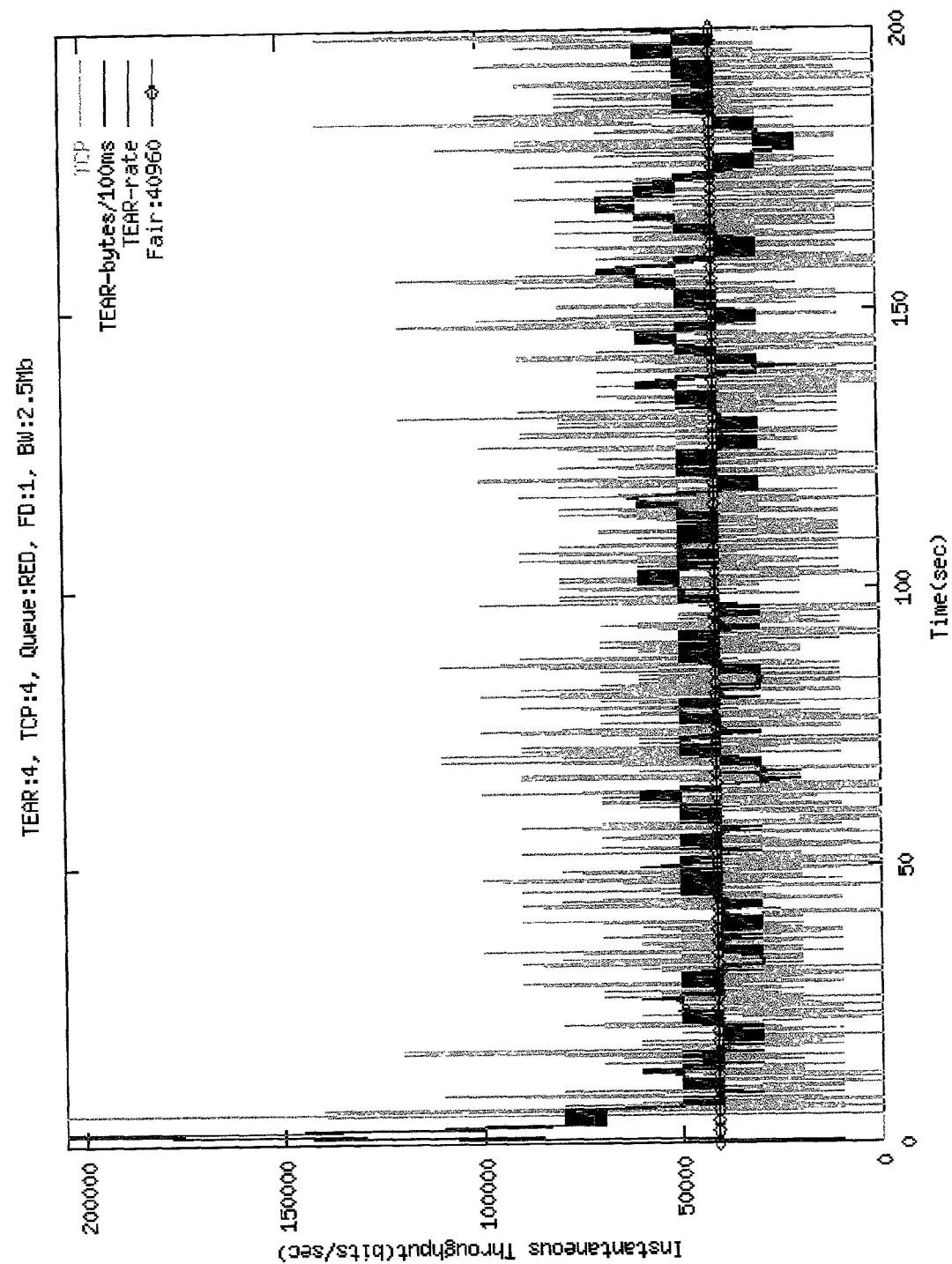
FIG. 14A is a graph of instantaneous throughput versus time for 4 TEAR flows and 4 TCP flows, a bottleneck of 2.5 megabits per second, a RED router, and feedback every 1 roundtrip time.
Figure 14B:
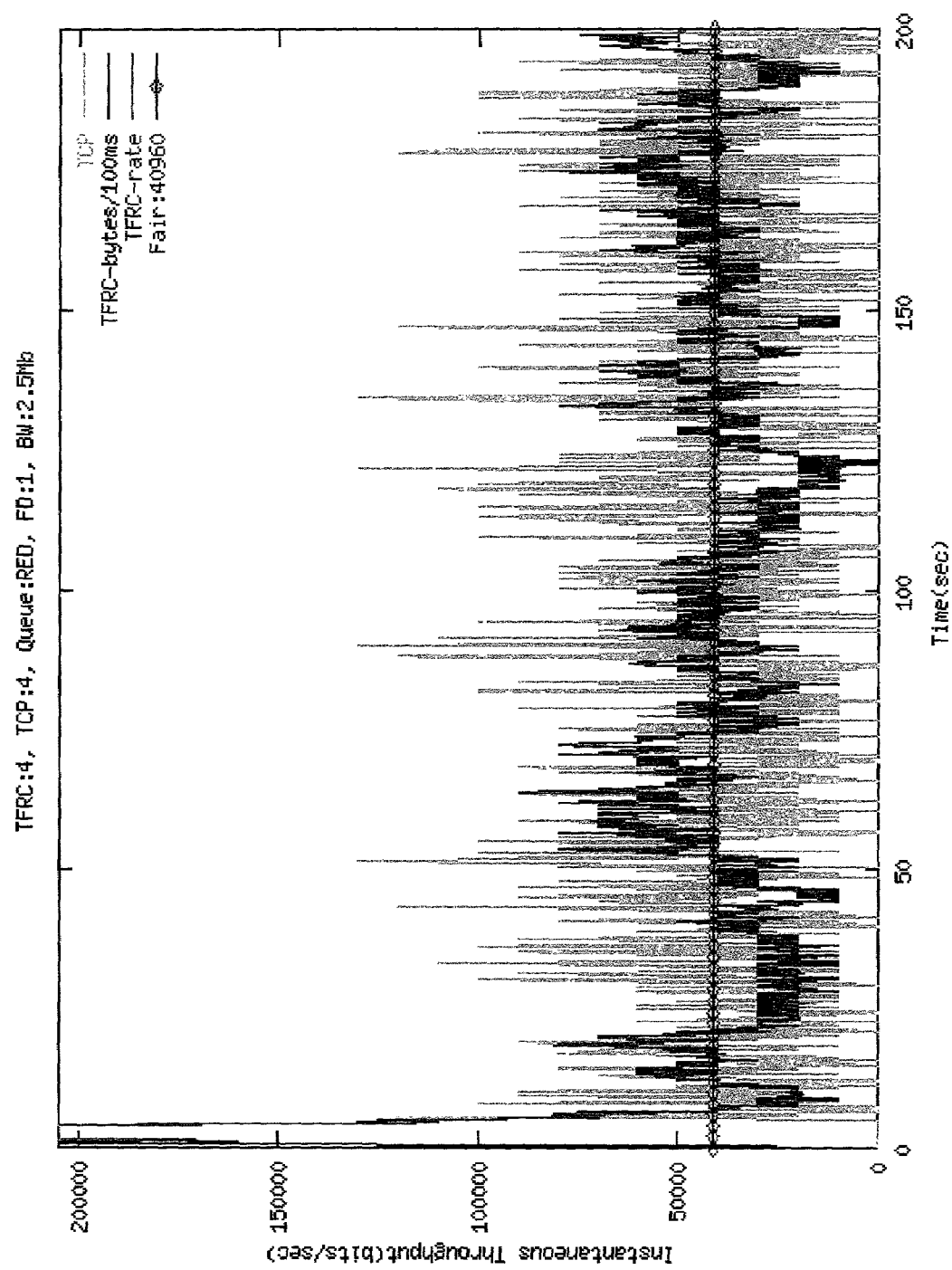
FIG. 14B is a graph of throughput versus time for 4 TFRC flows, 4 TCP flows, a bottleneck of 2.5 megabits per second, a RED router, and feedback every 1 roundtrip time.
Figure 15A:
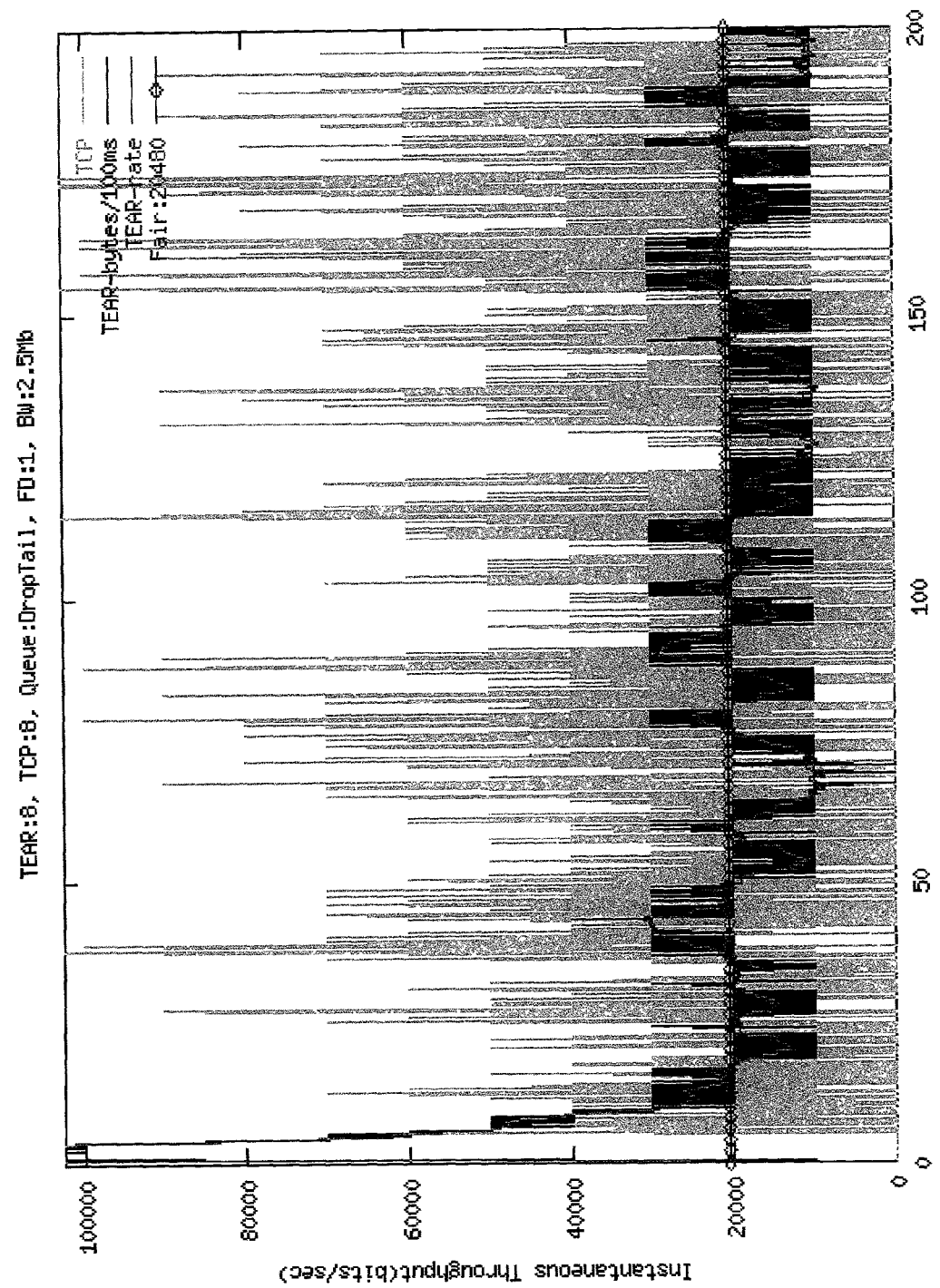
FIG. 15A is a graph of instantaneous throughput versus time for 8 TEAR flows, 8 TCP flows, a bottleneck of 2.5 megabits per second, a droptail router, and feedback latency of 1 roundtrip time.
Figure 15B:
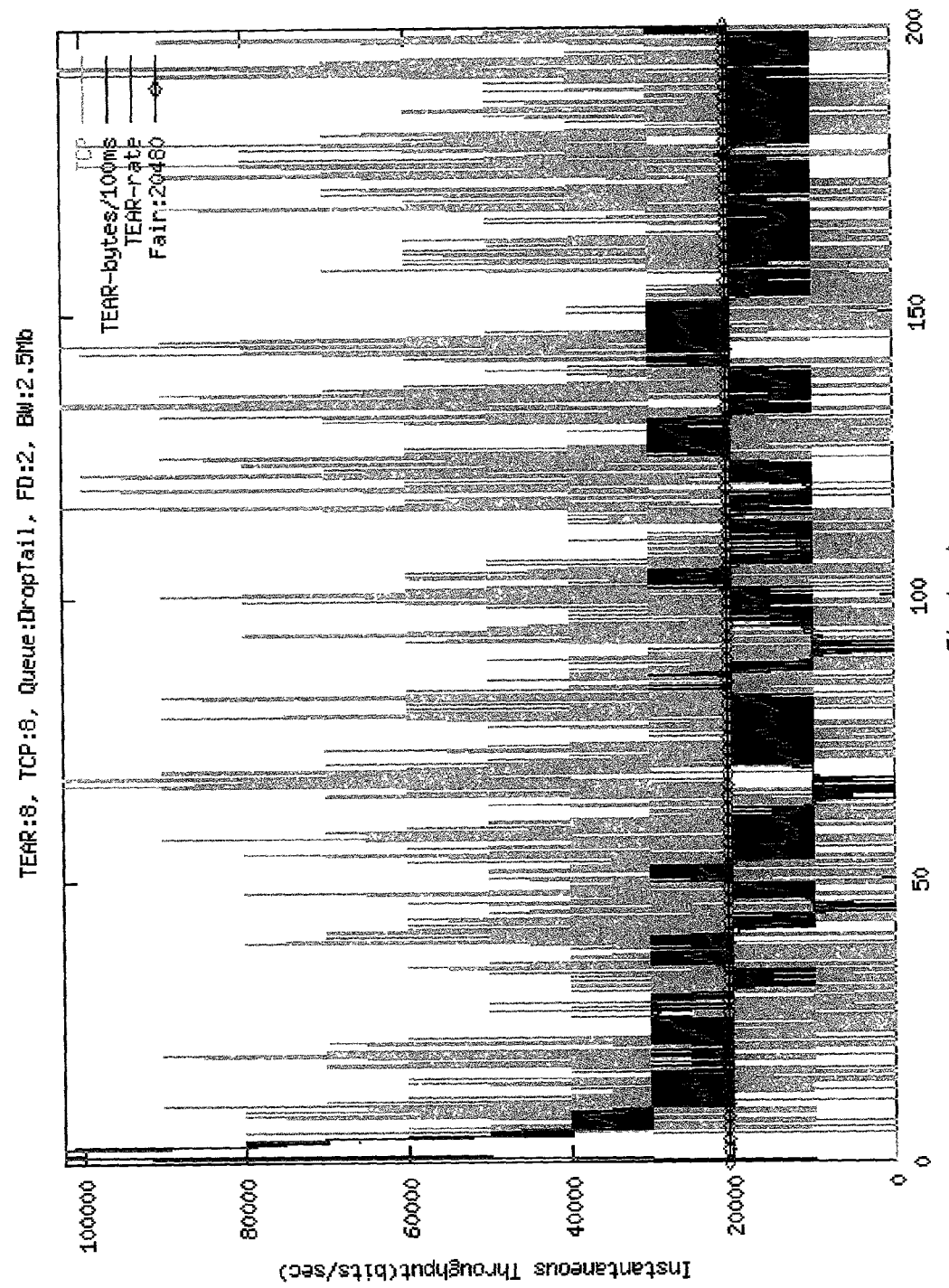
FIG. 15B is a graph of instantaneous throughput versus time for 8 TEAR flows, 8 TCP flows, a bottleneck of 2.5 megabits per second, a droptail router, and a feedback latency of 2 roundtrip times.
Figure 15C:
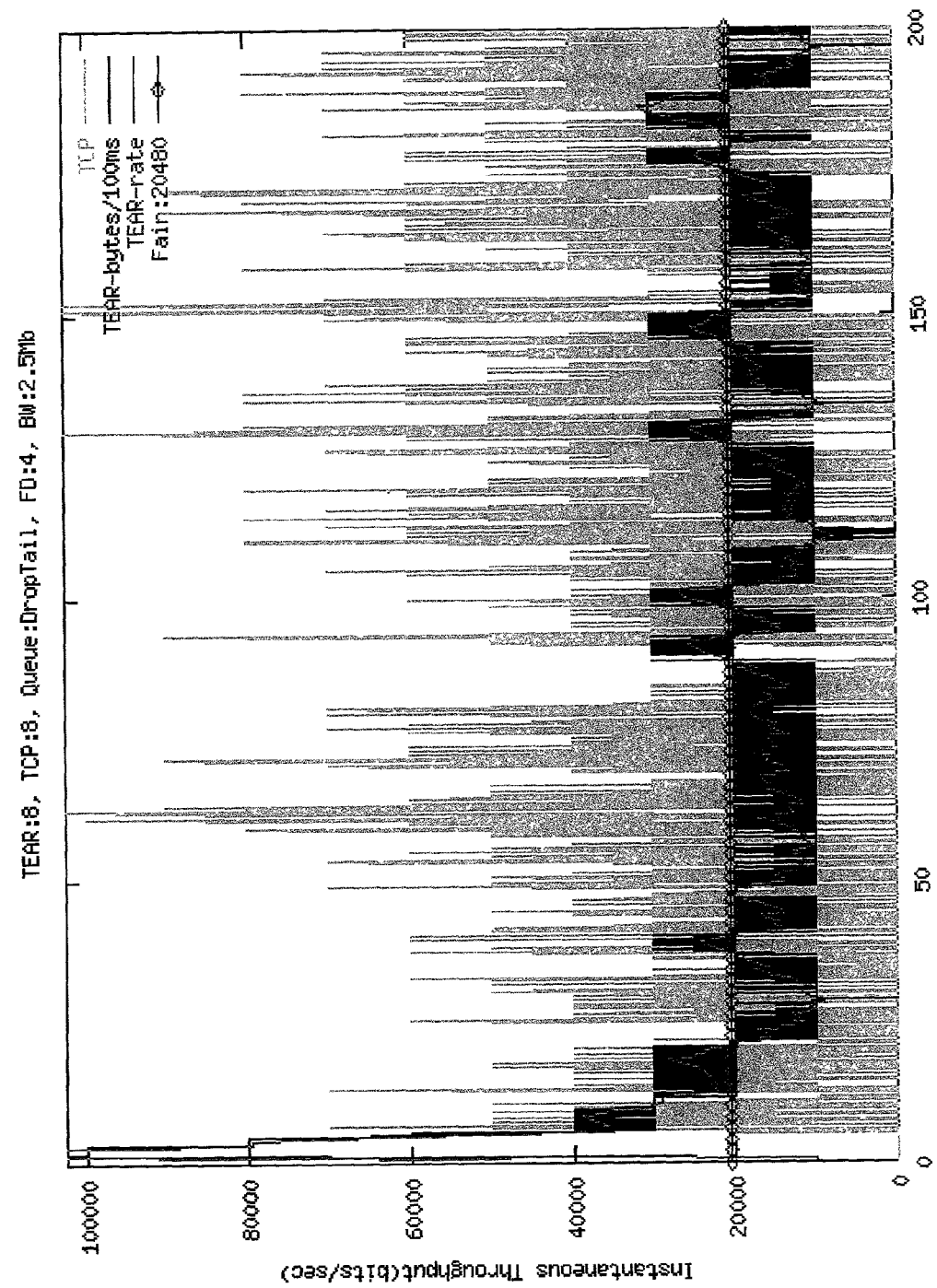
FIG. 15C is a graph of instantaneous throughput versus time for 8 TCP flows and 8 TEAR flows, a bottleneck of 2.5 megabits per second, a droptail router, and a feedback latency of 4 roundtrip times.
Figure 15D:
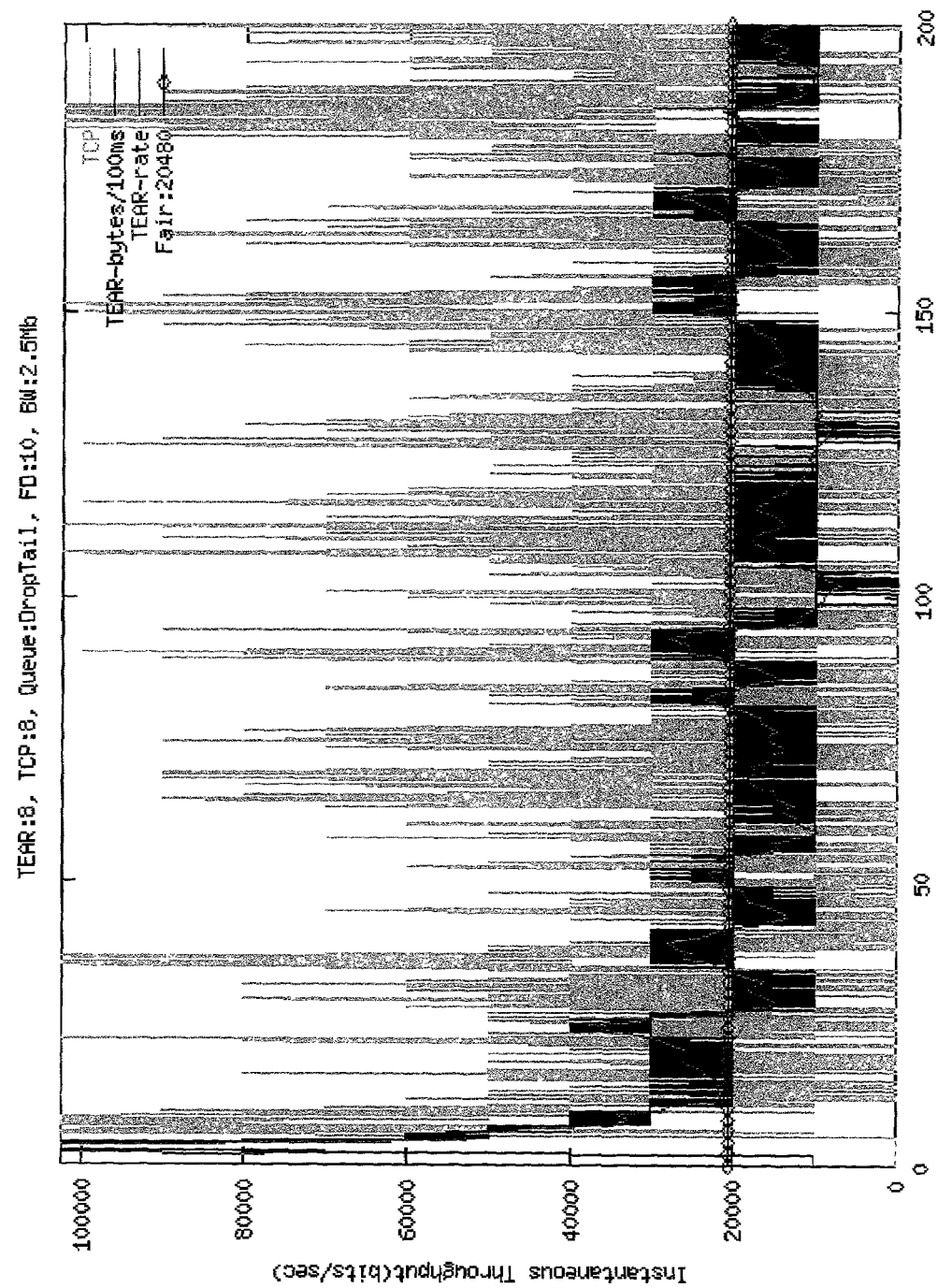
FIG. 15D is a graph of instantaneous throughput versus time for 8 TEAR flows, 8 TCP flows, a bottleneck of 2.5 megabits per second, a droptail router, and a feedback latency of 10 roundtrip times.
Figure 16A:
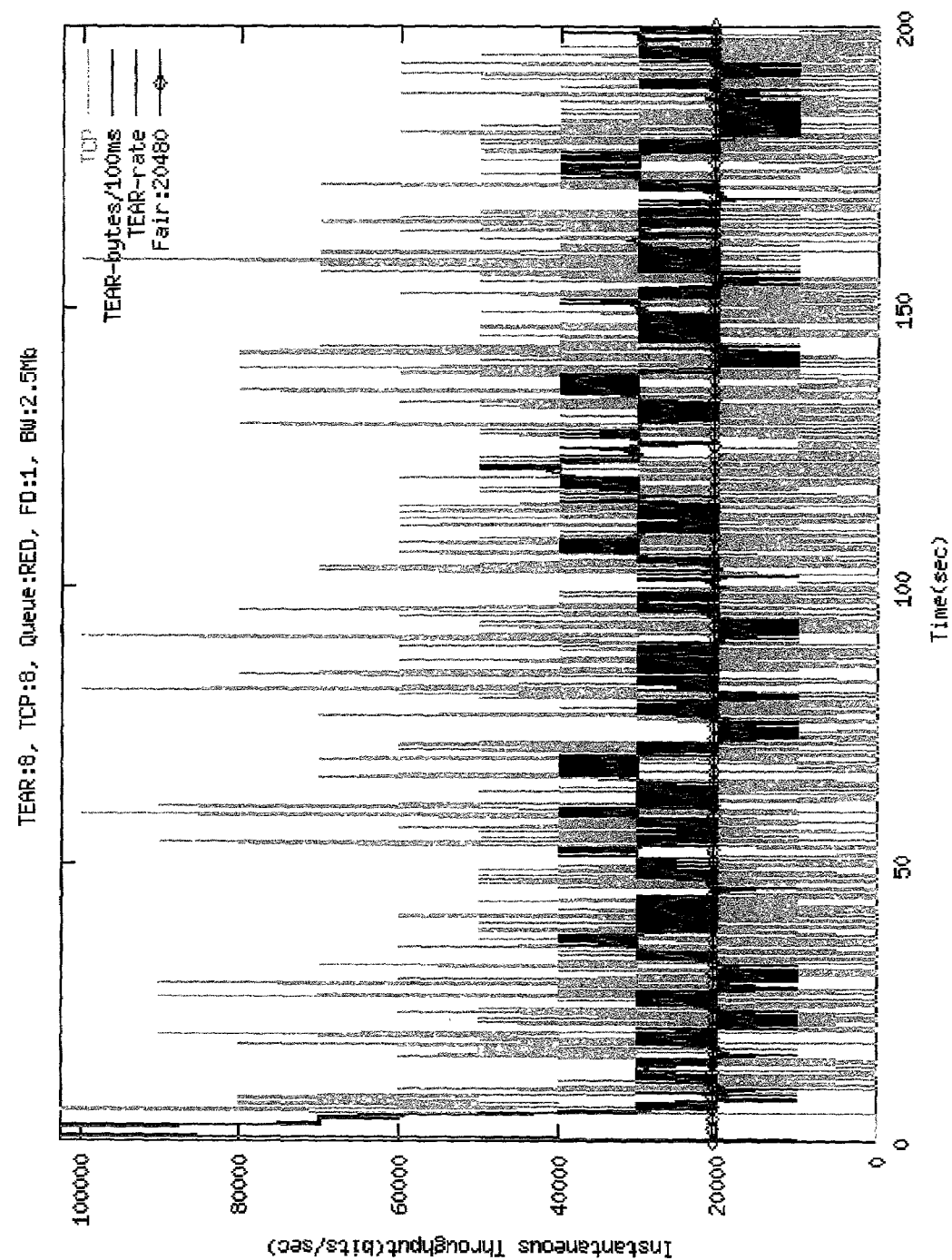
FIG. 16A is a graph of instantaneous throughput versus time for 8 TEAR flows, 8 TCP flows, a bottleneck of 2.5 megabits per second, a RED router, and a feedback latency of 1 roundtrip time.
Figure 16B:
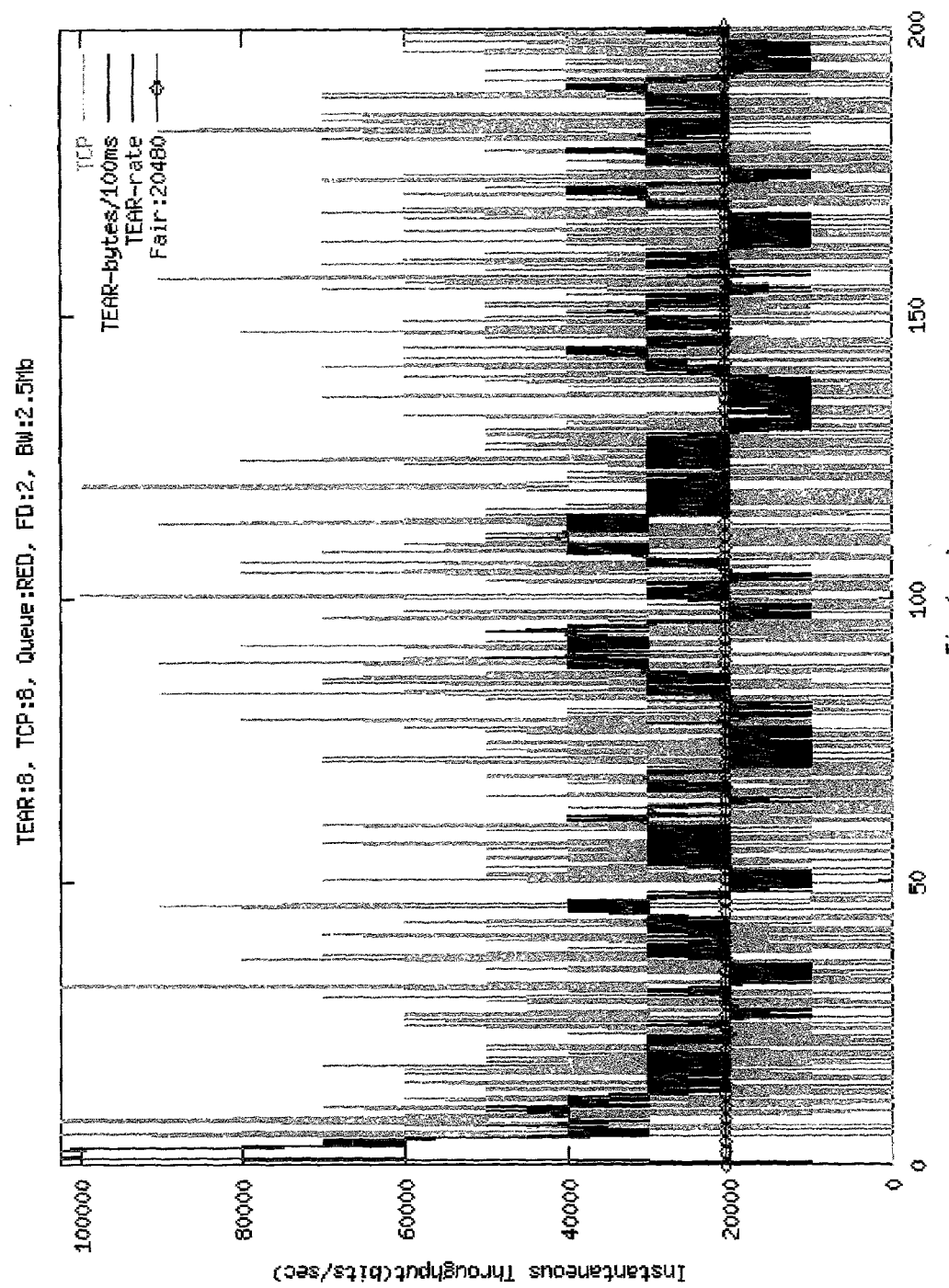
FIG. 16B is a graph of instantaneous throughput versus time for 8 TEAR flows, 8 TCP flows, a bottleneck of 2.5 megabits per second, a RED router, and a feedback latency of 2 roundtrip times.
Figure 16C:
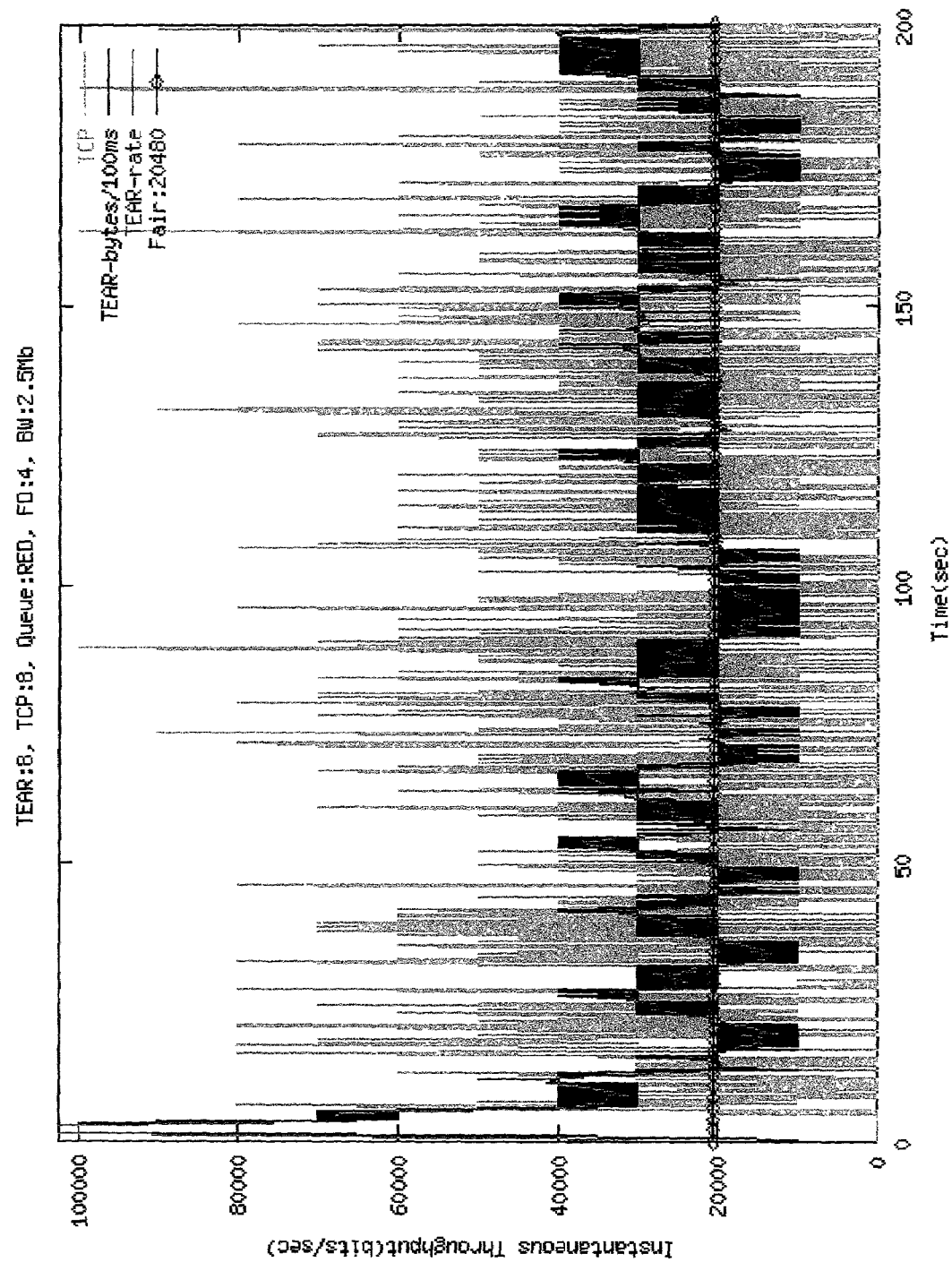
FIG. 16C is a graph of instantaneous throughput versus time for 8 TEAR flows, 8 TCP flows, a bottleneck of 2.5 megabits per second, a RED router, and a feedback latency of 4 roundtrip times.
Figure 16D:
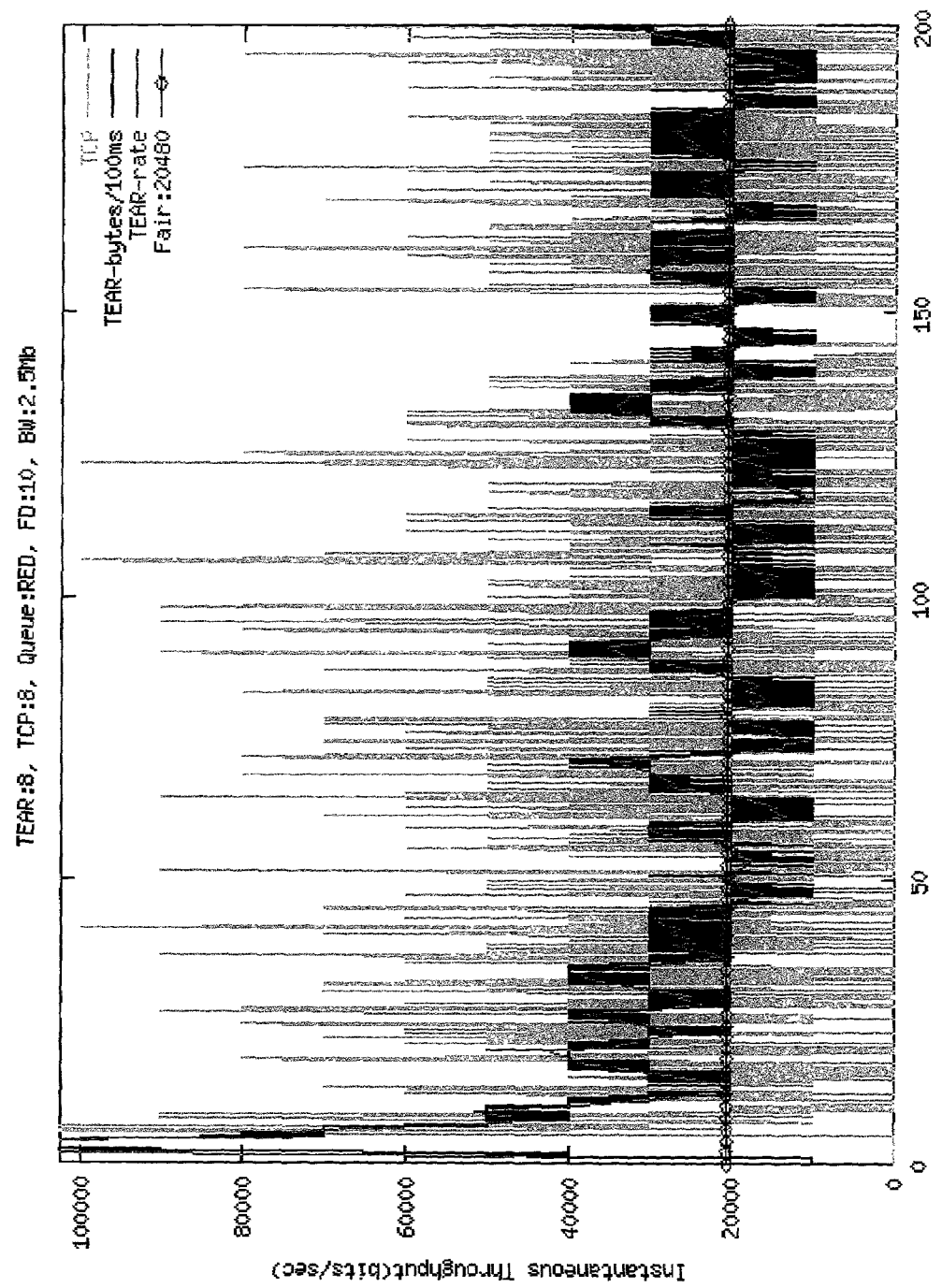
FIG. 16D is a graph of instantaneous throughput versus time for 8 TEAR flows, 8 TCP flows, a bottleneck of 2.5 megabits per second, a RED router, and a feedback latency of 10 roundtrip times.
Figure 17A:
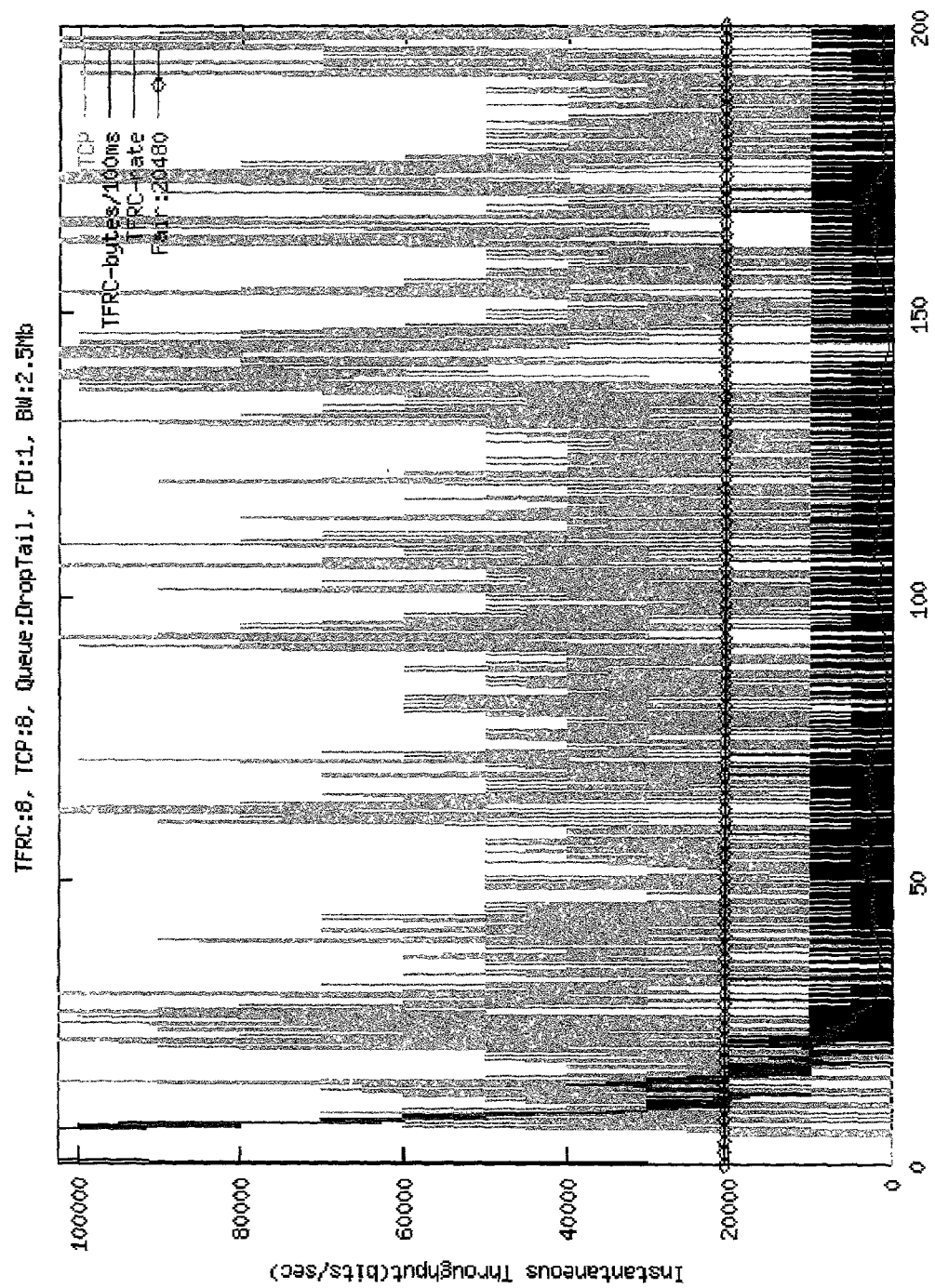
FIG. 17A is a graph of instantaneous throughput versus time for 8 TFRC flows, 8 TCP flows, a bottleneck of 2.5 megabits per second, a droptail router, and a feedback latency of 1.5 roundtrip times.
Figure 17B:
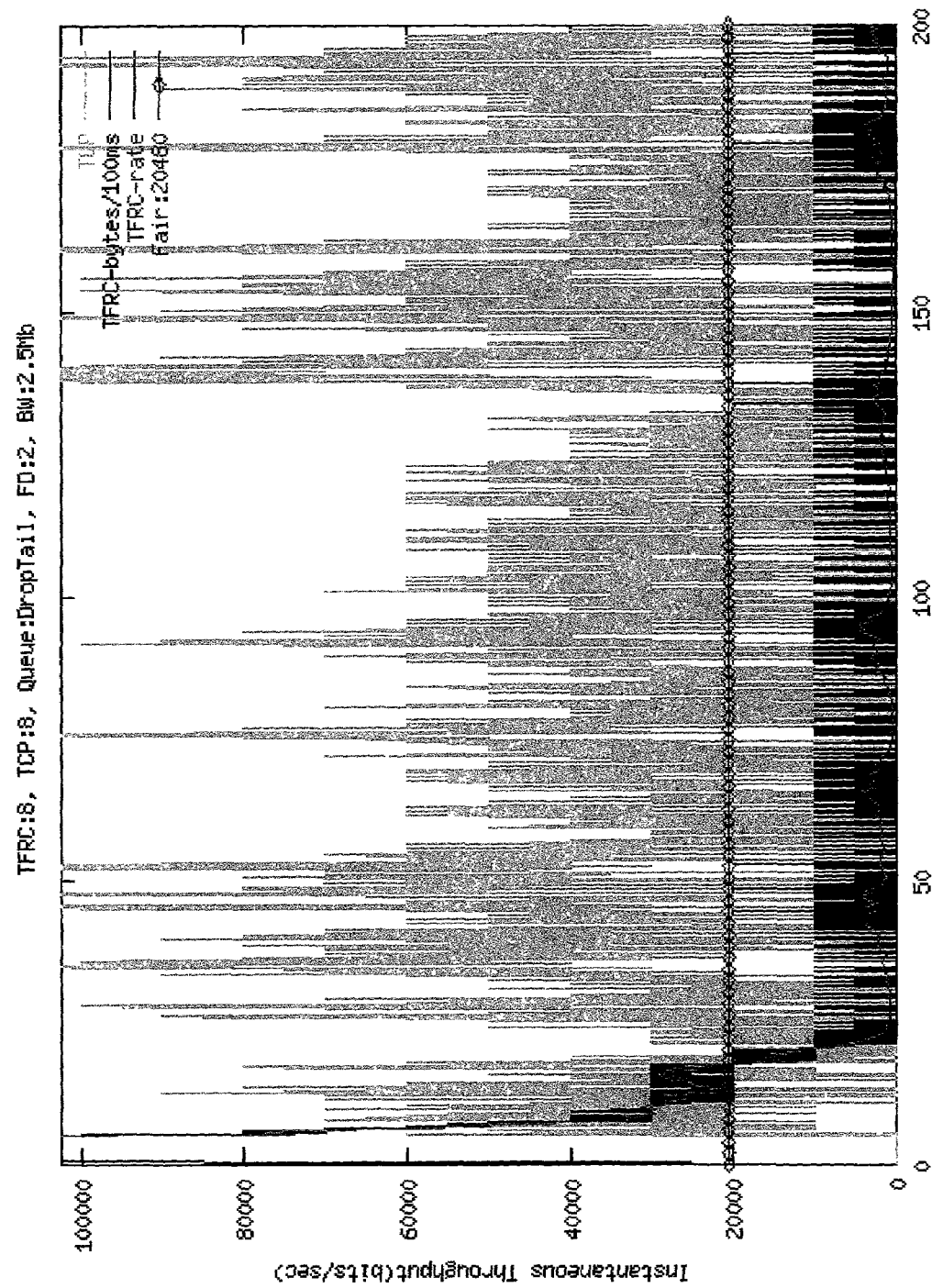
FIG. 17B is a graph of instantaneous throughput versus time for 8 TFRC flows, 8 TCP flows, a bottleneck of 2.5 megabits per second, a droptail router, and a feedback latency of 2 roundtrip times.
Figure 17C:
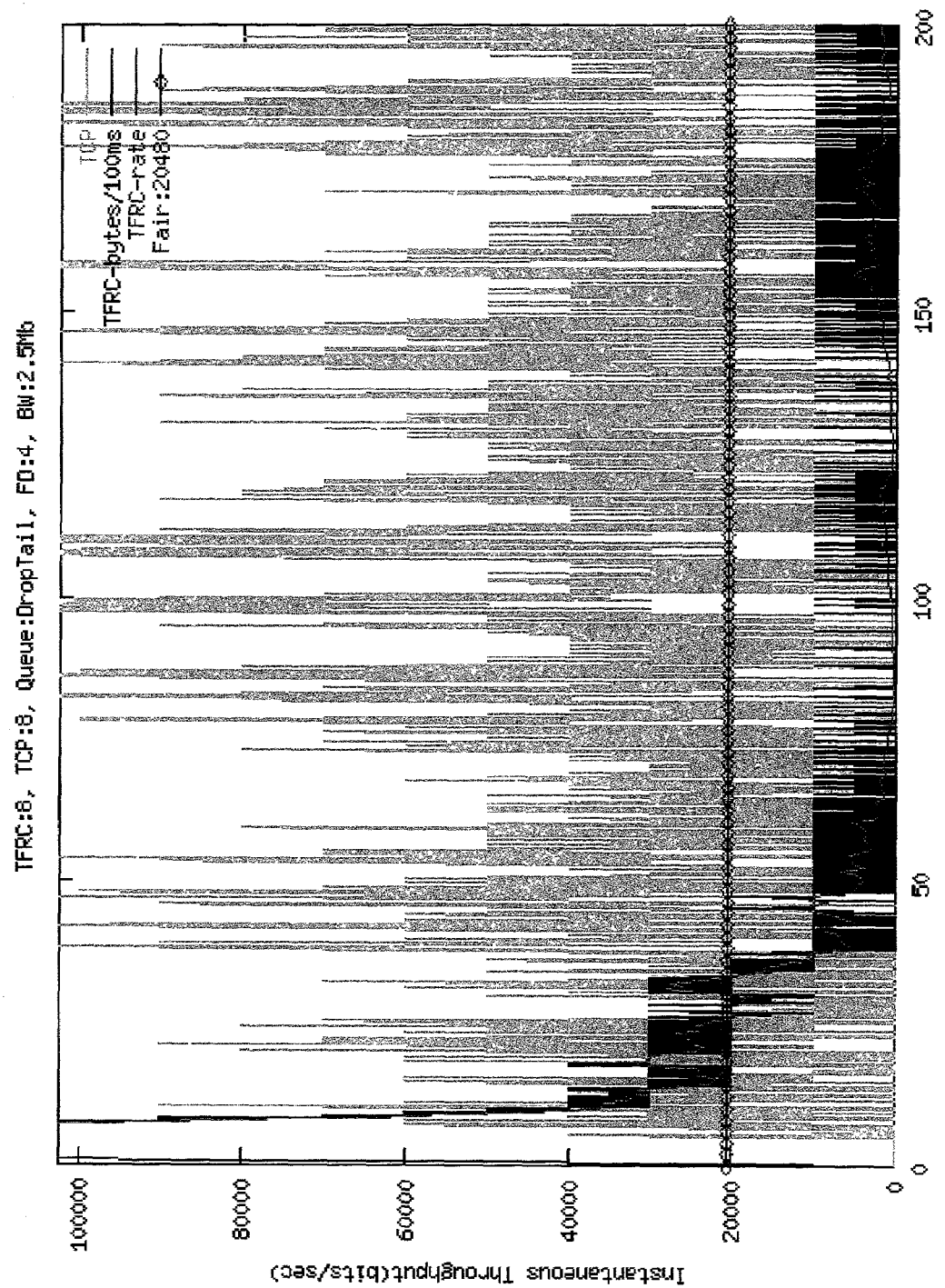
FIG. 17C is a graph of instantaneous throughput versus time for 8 TFRC flows, 8 TCP flows, a bottleneck of 2.5 megabits per second, a droptail router, and a feedback latency of 4 roundtrip times.
Figure 17D:
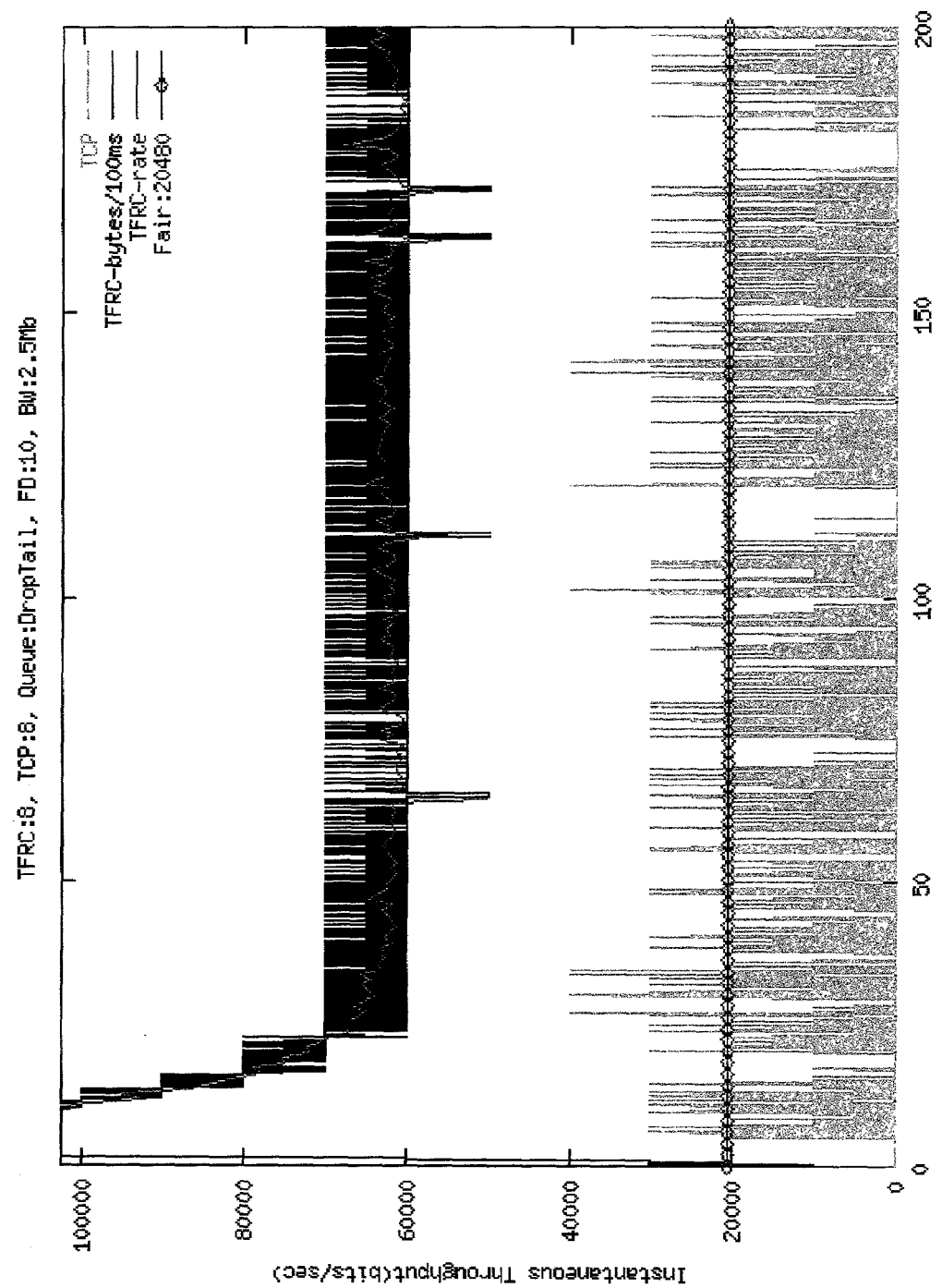
FIG. 17D is a graph of instantaneous throughput versus time for 8 TFRC flows, 8 TCP flows, a bottleneck of 2.5 megabits per second, a droptail router, and a feedback latency of 10 roundtrip times.
Figure 18A:
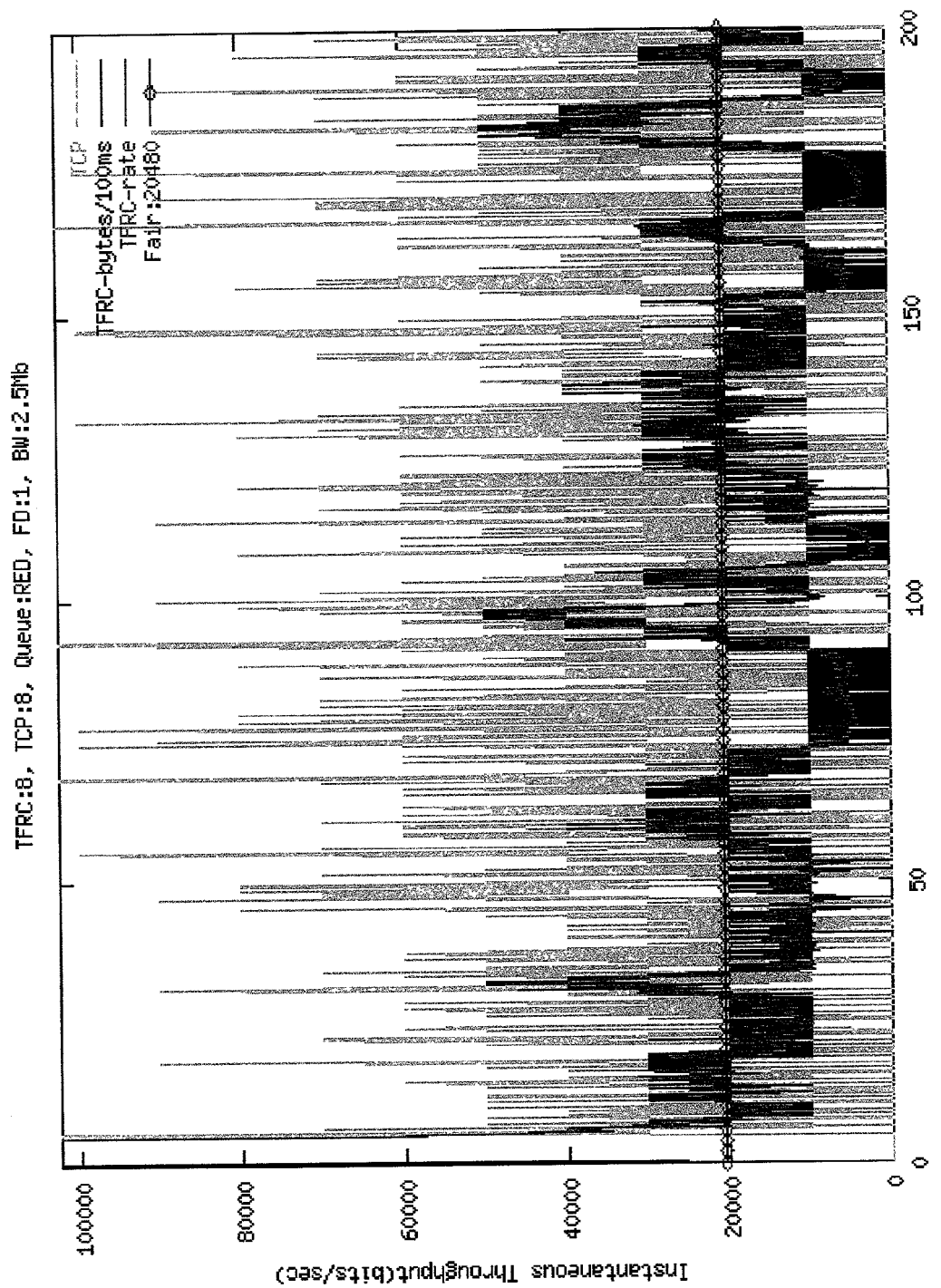
FIG. 18A is a graph of instantaneous throughput versus time for 8 TFRC flows, 8 TCP flows, a bottleneck of 2.5 megabits per second, a RED router, and a feedback latency of 1.5 roundtrip times.
Figure 18B:
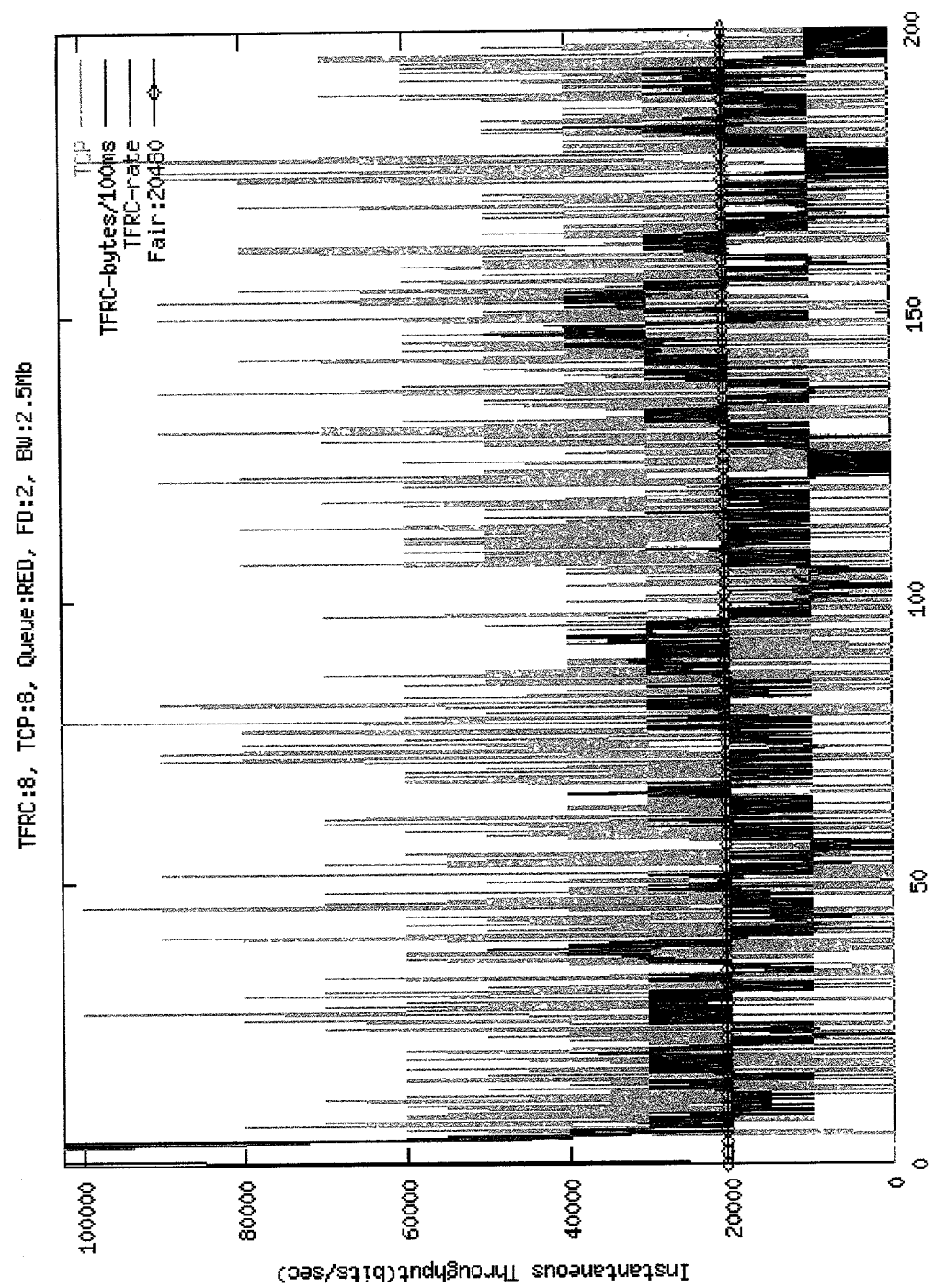
FIG. 18B is a graph of instantaneous throughput versus time for 8 TFRC flows, 8 TCP flows, a bottleneck of 2.5 megabits per second, a RED router, and a feedback latency of 2 roundtrip times.
Figure 18C:
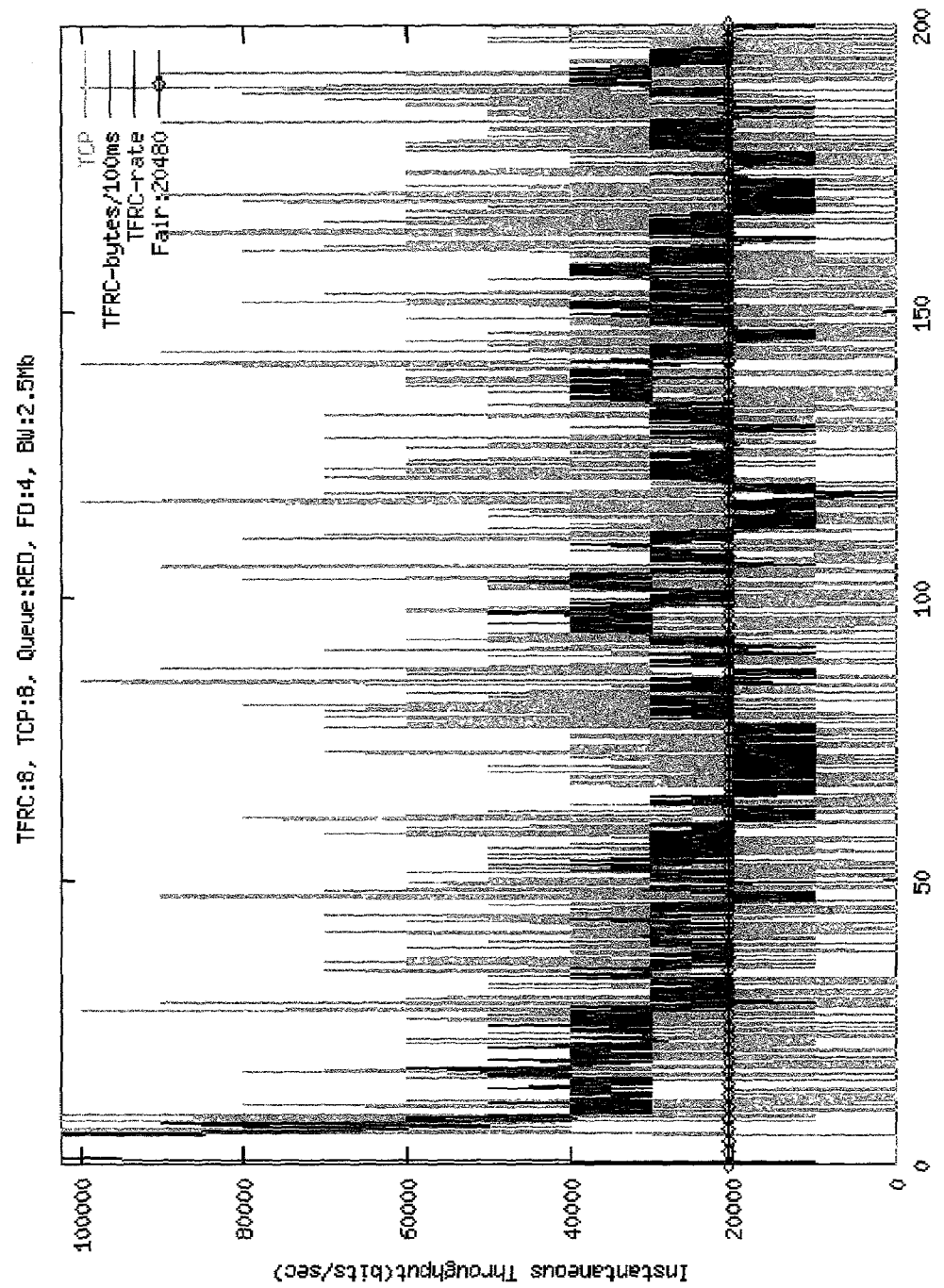
FIG. 18C is a graph of instantaneous throughput versus time for 8 TFRC flows, 8 TCP flows, a bottleneck of 2.5 megabits per second, a RED router, and a feedback latency of 4 roundtrip times.
Figure 18D:
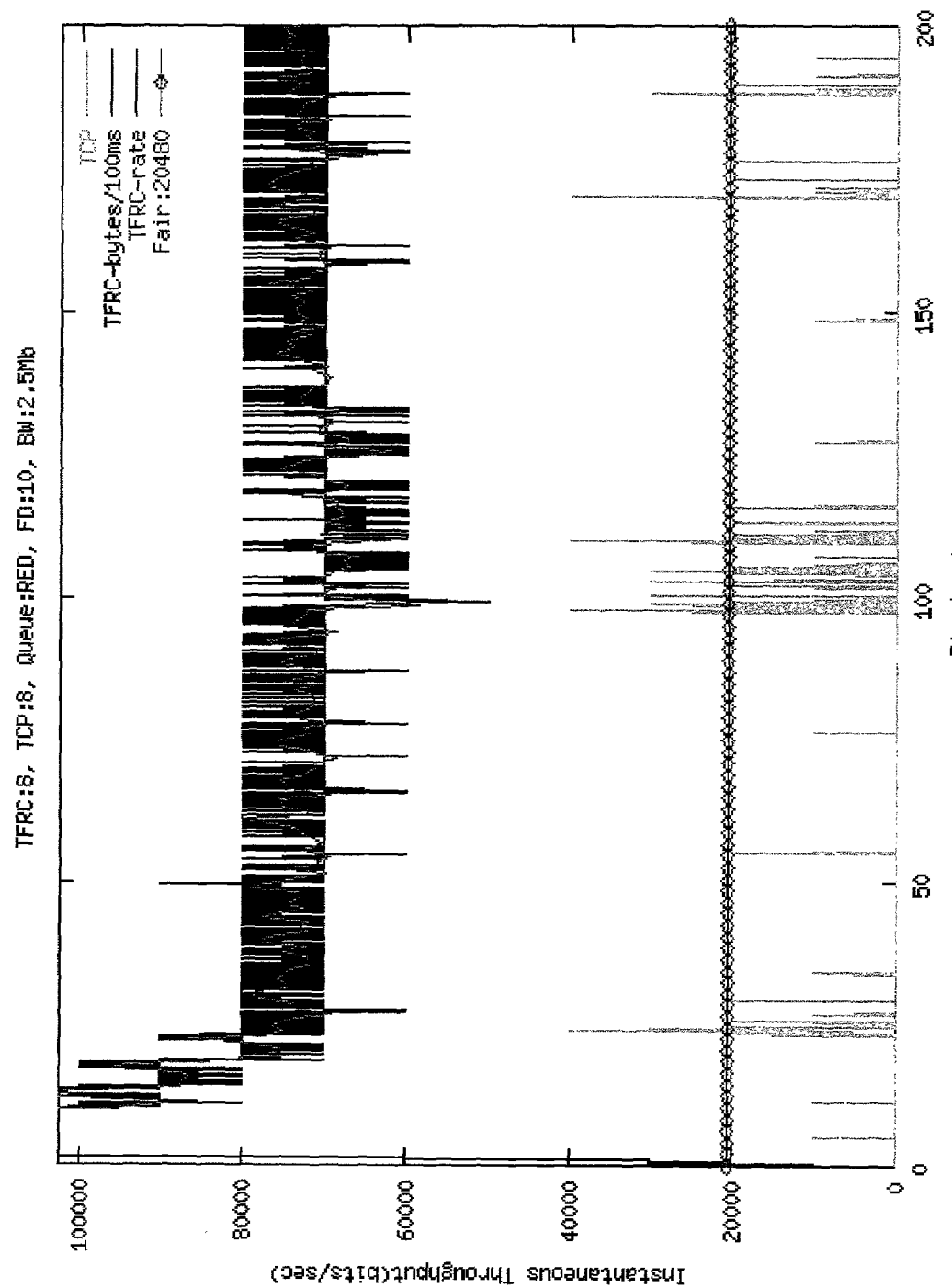
FIG. 18D is a graph of instantaneous throughput versus time for 8 TFRC flows, 8 TCP flows, a bottleneck of 2.5 megabits per second, a RED router, and a feedback latency of 10 roundtrip times.

As the number of computing flows increases, the rate fluctuations of TFRC greatly subsides (especially, in terms of size). However, in terms of the number of rate fluctuations, we still see many fluctuations. FIGS. 14A and 14B are from the run with the bottleneck bandwidth 2.5 Mbps, a RED router, and a ratio of flows of 4:4. While the TEAR flow shows very stable rate oscillations (fewer and lower), the TFRC flow still undergoes many fluctuations.

Sensitivity to Feedback Latency

In this section, the performance of TEAR and TFRC is examined over various values of feedback latency. The current implementation of TFRC is not designed to handle larger feedback latency. So the results with larger feedback delays may not be of the inherent characteristics of TFRC.

FIGS. 15A–D and 16A–D are from the runs with 8 TEAR flows and 8 TCP flows, a 2.5 Mbps bottleneck, and a droptail router. Four experiments were conducted, each with a different value of the feedback latency taken from 1 RTT, 2

RTTs, 4 RTTs, and 10 RTTs. In all runs, TEAR shows consistent fairness. The rate fluctuations are consistently low.

FIGS. 17A–D are from the runs with 8 TFRC flows and 8 TCP flows on a 2.5 Mbs droptail bottleneck. FIGS. 18A–D are from runs with 8 TFRC flows and 8 TCP flows, a 2.5 megabit per second bottleneck, and a RED router. Three experiments were conducted, each with a different value of the feedback latency taken from 1.5 RTTs, 4 RTTs, and 10 RTTs. The performance of TFRC under these environments is slightly unpredictable. When using 1.5 RTTs and 4 RTTs, the bandwidth shares of TFRC are very low. However, when using 10 RTTs, its bandwidth shares are very high.

SUMMARY

Thus, the present invention includes a new approach to flow control referred to herein as TCP emulation at receivers (TEAR) for unicast and multicast streaming. The TEAR flow control protocol described herein fair, TCP-friendly, stable and scalable. At the same time, the rate does not fluctuate much over the fair share. These properties hold under various network environments including traditional symmetric networks, and emerging asymmetric networks.

The TEAR protocol described above is suitable for long-running streaming applications. Preliminary work on verifying the performance of the protocol is presented and the protocol is compared with TFRC, a competing TCP-friendly unicast protocol based on a TCP-friendly formula.

Both the TEAR and TRFC protocols possess many desirable properties for streaming applications when their flows compete with long-running TCP-SACK flows. Both protocols show fairness and TCP-friendliness, and excellent smoothness in rate fluctuations. When compared to TFRC, TEAR shows better fairness and smoothness. TFRC shows performance glitches when competing with many TCP flows for a small amount of bottleneck bandwidth. Their rates under this environment drop almost to zero. This drop might be due to inaccuracy in estimating loss rates and in the TCP formula itself. This problem is inherent in the mode-based (or equation-based) approach.

The experiments described herein are focused on studying the behavior of TEAR and TFRC under steady state where all the traffic is generated by long-running flows. Clearly this environment is not realistic because today's Internet traffic is made of many short-lived flows. More experiments involving more realistic background traffic and Internet traffic can be conducted.

TEAR can be used to enhance the scalability of multicast flow control. In TEAR, receivers estimate their own appropriate receiving rates. Thus, the work is naturally distributed. Because it can provide an accurate estimate of TCP-friendly rates even with a low frequency of feedback, TEAR helps solve feedback implosion problem.

Two types of TEAR-based multicast flow control are possible. First, in receiver-driven layered multicast, receivers can use TEAR to determine their TCP-friendly receiving rates, and receivers can join enough multicast layers (assuming all layers are transmitted at a equal rate) to receiver at their estimated rates. In this case, little involvement from the sender is needed for flow control. Second, in sender-driven multicast, receivers can periodically feedback their rates estimated by TEAR to the sender. The sender selects the bottleneck receiver based on these rate reports, and sets its rate to the one reported by that receiver.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for rate-based flow control between a sender and a receiver, the method comprising:
    (a) at a sender, sending packetized information to a receiver at a first rate;
    (b) at the receiver:
        (i) receiving the packetized information;
        (ii) emulating at least one flow control function of a transmission control protocol (TCP) sender to compute a congestion window size based on the packetized information;
        (iii) computing a round-trip time;
        (iv) computing a transmission rate based on the congestion window size and the round-trip time;
        (v) periodically transmitting the transmission rate to the sender; and
    (c) at the sender, controlling the rate for sending the packetized information to the receiver based on the transmission rate received from the receiver and thereby utilizing a TCP-friendly share of available transmission bandwidth over a time interval.

2. The method of claim 1 wherein computing a congestion window size comprises computing an average congestion window size over a predetermined time interval, computing a round-trip time comprises computing an average round-trip time over the time interval, and computing the transmission rate includes dividing the average congestion window size by the average round-trip time.

3. The method of claim 1 wherein computing a congestion window size at the receiver includes incrementing the congestion window size by one segment in response to receiving a properly-sequenced packet from the sender.

4. The method of claim 1 wherein computing a congestion window size at the receiver includes maintaining a current congestion window size in response to receiving an improperly sequenced packet from the sender.

5. The method of claim 1 comprising, at the receiver, wherein emulating at least one flow control function of a TCP sender includes implementing a state machine including TCP-sender-like flow control states for adjusting the congestion window size.

6. The method of claim 5 wherein implementing a state machine includes implementing a state machine having a slow start state in which the congestion window size is incremented by one segment in response to receiving a properly-sequenced packet from the sender.

7. The method of claim 6 wherein implementing a state machine includes implementing a state machine having a congestion avoidance state in which the congestion window size is increased by the inverse of a previous congestion window size in response to receiving a properly-sequenced packet from the sender.

8. The method of claim 7 wherein implementing a state machine comprises implementing a state machine including a gap state reachable from the slow start state and the congestion avoidance state in response to receiving an improperly sequenced packet from the sender.

9. The method of claim 8 comprising, in response to receiving a packet that triggered transition to the gap state, transitioning to the state that the receiver was in prior to entering the gap state.

10. The method of claim 8 wherein implementing a state machine comprises implementing a state machine having a fast recovery state reachable from the gap state in which the receiver reduces the congestion window size only once in response to multiple packet losses within a single congestion window.

11. The method of claim 1 wherein the sender adjusts the transmission rate without receiving per-packet acknowledgements from the receiver.

12. The method of claim 8 wherein computing a congestion window size comprises computing an average congestion window size over a predetermined time interval, computing a round-trip time comprises computing an average round-trip time over the time interval, and computing the transmission rate includes dividing the average congestion window size by the average round-trip time.

13. The method of claim 12 comprising dynamically adjusting the predetermined time period based on the state of the receiver.

14. The method of claim 13 wherein dynamically adjusting the predetermined time period includes setting the time period equal to a value equal to the time difference between a first time when the receiver enters the slow start or congestion avoidance state and a second time when the receiver re-enters the slow-start or congestion avoidance state.

15. The method of claim 1 wherein computing a round-trip time includes estimating the roundtrip time based on the time to receive packets from the sender equal to a current congestion window size.

16. The method of claim 1 wherein computing the transmission rate includes computing the transmission rate based on a weighted average of a plurality of congestion window sizes divided by corresponding roundtrip times.

17. The method of claim 16 wherein computing a weighted average includes weighting recent congestion window sizes more heavily than older congestion window sizes.

18. A receiver-based system for controlling flow of packetized data between a sender and a receiver, the system comprising:
  (a) a sender for sending packetized data over a network; and
  (b) a receiver for receiving the packetized data from the sender, for computing a round-trip time and for emulating at least one flow control (TCP) function of a transmission control protocol (TCP) sender to compute a congestion window size and using the congestion window size and the round-trip time to compute a transmission rate the sender, wherein the sender adjusts its rate for sending the packetized data to the receiver based on the transmission rate and thereby utilizes a TCP-friendly share of available transmission bandwidth over a time interval.

19. The system of claim 18 wherein the receiver is adapted to compute the congestion window size and the round-trip time based on packets received from the sender.

20. The system of claim 19 wherein the receiver is adapted to compute an average congestion window size and an average round-trip time over a predetermined time interval and to compute the transmission rate based on the average congestion window size and the average round-trip time, thereby smoothing fluctuations in the transmission rate.

21. The system of claim 19 wherein the receiver is adapted to implement a state machine including TCP-sender-like flow control states for adjusting the congestion window size used to compute the transmission rate.

22. The system of claim 21 wherein the state machine includes a slow start state in which the congestion window size is incremented by one segment in response to receiving a properly-sequenced packet from the sender.

23. The system of claim 22 wherein the state machine includes a congestion avoidance state in which the congestion window size is increased by the inverse of a previous congestion window size in response to receiving a properly-sequenced packet from the sender.

24. The system of claim 23 wherein the state machine includes a gap state reachable from the slow start state and the congestion avoidance state in response to receiving an improperly sequenced packet from the sender.

25. The system of claim 24 wherein, in response to receiving a packet that triggered transition to the gap state, the receiver is adapted to transition to the state that the receiver was in prior to entering the gap state.

26. The system of claim 24 wherein the state machine includes a fast recovery state reachable from the gap state in which the receiver reduces the congestion window size only once in response to multiple packet losses within a single congestion window.

27. The system of claim 18 wherein the sender is adapted to adjust its rate for sending packetized data to the receiver without receiving per-packet acknowledgements from the receiver.

28. The system of claim 24 wherein the receiver is adapted to compute an average congestion window size and an average round-trip time over a predetermined time interval and to compute the transmission rate based on the average congestion window size and the average round-trip time, thereby smoothing fluctuations in the transmission rate.

29. The system of claim 28 wherein the receiver is adapted to dynamically adjust the predetermined time period based on the state of the receiver.

30. The system of claim 29 wherein dynamically adjusting the predetermined time period includes setting the time period equal to a value equal to the time difference between a first time when the receiver enters the slow start or congestion avoidance state and a second time when the receiver re-enters the slow-start or congestion avoidance state.

31. The system of claim 15 wherein the receiver is adapted to compute the transmission rate based on a weighted average of congestion window sizes.

32. The method of claim 1 wherein utilizing a TCP-friendly share of available transmission bandwidth over a time interval includes utilizing a share of the available transmission bandwidth that is substantially equal to B/m where B is the total bandwidth used by n TCP flows and m is the total number of flows of any protocol that use the available transmission bandwidth during the time interval.

33. The system of claim 18 wherein, in utilizing a TCP-friendly share of the available transmission bandwidth, the sender is adapted to utilize a share of the available transmission bandwidth that is substantially equal to B/m where B is the total bandwidth used by n TCP flows and m is the total number of flows of any protocol that use the available transmission bandwidth during the time interval.

* * * * *